United States Patent
Ochiai et al.

(10) Patent No.: US 12,253,603 B2
(45) Date of Patent: Mar. 18, 2025

(54) THREAT COPING SYSTEM

(71) Applicant: MITSUBISHI HEAVY INDUSTRIES, LTD., Tokyo (JP)

(72) Inventors: Atsushi Ochiai, Tokyo (JP); Koichi Hamamoto, Tokyo (JP); Tomoya Morioka, Tokyo (JP); Hiroyuki Daigo, Tokyo (JP); Kazunori Masukawa, Tokyo (JP); Shingo Nishikata, Tokyo (JP); Yoshinori Kamiya, Tokyo (JP); Yuichi Araki, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 336 days.

(21) Appl. No.: 17/441,342

(22) PCT Filed: Feb. 17, 2020

(86) PCT No.: PCT/JP2020/006078
§ 371 (c)(1),
(2) Date: Sep. 21, 2021

(87) PCT Pub. No.: WO2021/009955
PCT Pub. Date: Jan. 21, 2021

(65) Prior Publication Data
US 2022/0163670 A1 May 26, 2022

(30) Foreign Application Priority Data
Jul. 12, 2019 (JP) .................................. 2019-130595

(51) Int. Cl.
*G01S 17/66* (2006.01)
*G01S 17/04* (2020.01)
(Continued)

(52) U.S. Cl.
CPC .............. *G01S 17/66* (2013.01); *G01S 17/04* (2020.01); *G01S 17/06* (2013.01); *G06V 20/38* (2022.01); *G06V 2201/07* (2022.01)

(58) Field of Classification Search
CPC .............. G06V 20/17; G06V 2201/00; G06V 2201/07; G01S 17/06; G01S 17/04;
(Continued)

(56) References Cited

U.S. PATENT DOCUMENTS 6,609,597 B1 * 8/2003 Heideman ................. F16F 9/52
91/5
9,121,669 B1 * 9/2015 Hyslop ................. F41G 7/2206
(Continued)

FOREIGN PATENT DOCUMENTS

| JP | 2012-092990 | 5/2012 |
| JP | 5626966 | 11/2014 |

(Continued)

OTHER PUBLICATIONS

International Preliminary Report on Patentability issued Jan. 27, 2022 in International (PCT) Application No. PCT/JP2020/006078, 5 pages.

(Continued)

*Primary Examiner* — Daniel I Walsh
(74) *Attorney, Agent, or Firm* — Wenderoth, Lind & Ponack, L.L.P.

(57) ABSTRACT

A threat coping system (10) is provided with a threat coping device (300) that copes with a coping target (30) and a control device (200) that controls the threat coping device. The control device (200) is provided with a no-coping area setting means (514) and a coping instruction means (526). The no-coping area setting means (514) sets a no-coping area (12) based on information of a no-coping target that is not to cope with. The coping instruction means (526)

(Continued)

generates an instruction signal, that instructs the threat coping device to cope a coping target, based on the no-coping area.

13 Claims, 15 Drawing Sheets

(51) Int. Cl.
*G01S 17/06* (2006.01)
*G06V 20/00* (2022.01)

(58) Field of Classification Search
CPC .......... G01S 13/04; F41A 17/08; F41H 11/02; F42B 15/01; B64U 2101/19
See application file for complete search history.

(56) References Cited

U.S. PATENT DOCUMENTS

| | | | |
|---|---|---|---|
| 9,668,321 B2 | 5/2017 | Hamamoto | |
| 9,671,200 B1* | 6/2017 | Anderson | F41G 7/224 |
| 10,703,451 B1* | 7/2020 | Adams | F41F 3/10 |
| 10,760,879 B2* | 9/2020 | Stark | F41H 13/0093 |
| 10,907,940 B1* | 2/2021 | Parker | G06N 20/00 |
| 11,488,385 B2* | 11/2022 | Morrow | G08G 5/0069 |
| 11,594,141 B1* | 2/2023 | Barnawi | G08G 5/0082 |
| 2002/0190891 A1* | 12/2002 | Viana | H01Q 21/064 |
| | | | 342/28 |
| 2004/0069927 A1* | 4/2004 | Billman | G02B 26/06 |
| | | | 250/206.1 |
| 2007/0169616 A1* | 7/2007 | Vickroy | F41H 11/02 |
| | | | 89/1.11 |
| 2008/0127814 A1* | 6/2008 | McKendree | F41A 17/08 |
| | | | 89/1.11 |
| 2011/0030538 A1* | 2/2011 | Ahrens | F41H 11/00 |
| | | | 342/107 |
| 2012/0210853 A1* | 8/2012 | Abershitz | B64F 1/04 |
| | | | 89/1.11 |
| 2012/0292450 A1* | 11/2012 | Rovinsky | F41J 9/08 |
| | | | 244/158.3 |
| 2014/0102288 A1* | 4/2014 | Yeshurun | F41H 11/00 |
| | | | 89/36.17 |
| 2014/0138474 A1* | 5/2014 | Sharpin | G06T 7/246 |
| | | | 244/3.22 |
| 2014/0251123 A1* | 9/2014 | Venema | F41G 3/06 |
| | | | 89/41.22 |
| 2015/0015869 A1* | 1/2015 | Smith | G01S 7/4802 |
| | | | 356/28.5 |
| 2017/0268852 A1* | 9/2017 | Kuhn | F41G 7/008 |
| 2018/0164820 A1* | 6/2018 | Aboutalib | B64U 80/82 |
| 2018/0218619 A1* | 8/2018 | Brown | G08G 5/0013 |
| 2018/0238661 A1* | 8/2018 | Blache | F42B 5/313 |
| 2019/0009904 A1* | 1/2019 | Winkle | G08G 5/0056 |
| 2019/0285388 A1* | 9/2019 | Klar | G01P 5/001 |
| 2019/0376759 A1* | 12/2019 | Cole | F41A 21/42 |
| 2020/0051438 A1* | 2/2020 | Magdaleno | G05D 1/104 |
| 2020/0108922 A1* | 4/2020 | Smith | G05D 1/12 |
| 2020/0108924 A1* | 4/2020 | Smith | F41H 11/02 |
| 2020/0108926 A1* | 4/2020 | Smith | G05D 1/101 |
| 2020/0166311 A1* | 5/2020 | Kolanek | G05D 1/106 |
| 2020/0272827 A1* | 8/2020 | Morrow | G06V 20/52 |
| 2020/0341117 A1* | 10/2020 | Sandford | G01S 17/93 |
| 2020/0346057 A1* | 11/2020 | Westphal | A62C 27/00 |
| 2020/0363824 A1* | 11/2020 | Levin | G01S 13/862 |
| 2021/0063120 A1* | 3/2021 | Taveniku | G06V 40/172 |
| 2021/0096255 A1* | 4/2021 | Turov | G01S 17/86 |
| 2021/0108896 A1* | 4/2021 | Levy | F41H 11/04 |
| 2021/0109192 A1* | 4/2021 | Keegan | F41H 13/0093 |
| 2021/0302533 A1* | 9/2021 | Parker | H04K 3/45 |
| 2022/0157060 A1* | 5/2022 | Park | G01S 19/00 |
| 2022/0163670 A1* | 5/2022 | Ochiai | G01S 17/66 |
| 2022/0236433 A1* | 7/2022 | Petrovic | G01S 19/01 |
| 2023/0080655 A1* | 3/2023 | Yomo | G01S 7/292 |
| | | | 342/450 |
| 2023/0088169 A1* | 3/2023 | Kenig | B64U 70/90 |
| | | | 244/76 R |
| 2023/0109635 A1* | 4/2023 | Palermo | H04W 40/16 |
| | | | 455/13.1 |
| 2023/0266102 A1* | 8/2023 | Cartella | F41H 11/02 |
| | | | 701/3 |
| 2024/0013532 A1* | 1/2024 | Yang | G06V 20/17 |
| 2024/0286774 A1* | 8/2024 | Taylor | B64U 20/87 |

FOREIGN PATENT DOCUMENTS

| | | |
|---|---|---|
| JP | 2017-072557 | 4/2017 |
| JP | 2018-525601 | 9/2018 |
| JP | 6415882 | 10/2018 |
| WO | 2018/089072 | 5/2018 |

OTHER PUBLICATIONS

Extended European Search Report issued May 3, 2022 in counterpart European Patent Application No. 20841248.6.
International Search Report issued Apr. 14, 2020 in International Application No. PCT/JP2020/006078.

* cited by examiner

| ID | Estimated Category | Location | Speed | Threat Level | Cope Flag | Suspend Flag |
|---|---|---|---|---|---|---|
| Coping Target 1 | Drone | | | 1 | 0 | 1 |
| Coping Target 2 | Aircraft | | | 5 | 1 | 0 |
| Coping Target 3 | ... | | | | | |

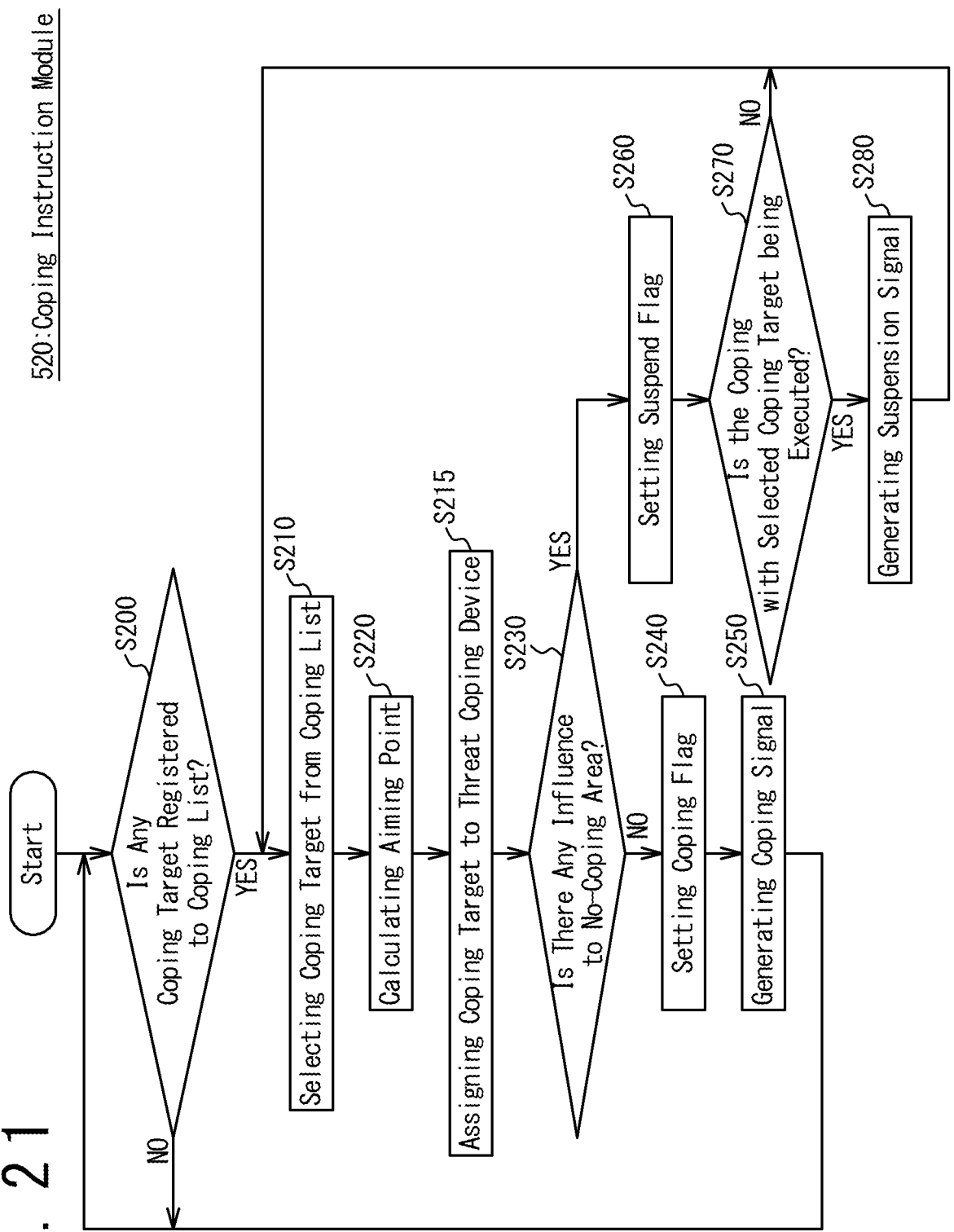

THREAT COPING SYSTEM

TECHNICAL FIELD

The present invention relates to a threat coping system.

BACKGROUND

It is necessary to cope with attacks without notice such as terrorism. When a drone or an Unmanned Aerial Vehicle (UAV) is used in such an attack, it is necessary to cope with a drone or the like that is mixed with commercial aircrafts.

For example, Patent Literature 1 discloses a device for controlling headlight of vehicle. This device for controlling generates information on forward vehicle based on image information in which an image of an anterior area is captured and road information concerning a latent trouble when detecting a forward vehicle existing in the anterior area, and controls an irradiation area of the headlight according to the generated forward vehicle information.

Patent Literature 2 discloses a light irradiation system that confirms safety of a target object, such as a person, to protect from reflection light or scattered light when irradiating laser. This light irradiation system determines a degree of safety of a target object for incident light based on a location of the target object and irradiation direction of the laser light.

CITED LIST

Patent Literature

[Patent Literature 1] Japanese Patent No. 5626966 B2
[Patent Literature 2] Japanese Patent No. 6415882 B2

SUMMARY

In view of the above-described situation, an objective is to provide a threat coping system that suppress misfiring. Other objectives would be understood from the following disclosure and description of embodiments.

A threat coping system according to an embodiment that is to achieve the above-mentioned objective is provided with a threat coping device that copes with a coping target and a control device that controls the threat coping device. The control device is provided with a no-coping area setting means and a coping instruction means. The no-coping area setting means sets a no-coping area based on information of a no-coping target that is not to cope with. The coping instruction means generates an instruction signal, that instructs the threat coping device to cope with a coping target, based on the no-coping area.

According to the above-described embodiment, misfiring can be suppressed.

BRIEF DESCRIPTION OF THE DRAWINGS

FIG. 21 is a flowchart that shows processes executed by the coping instruction module according to an embodiment.

DETAILED DESCRIPTION

Embodiment 1

Figure 1:
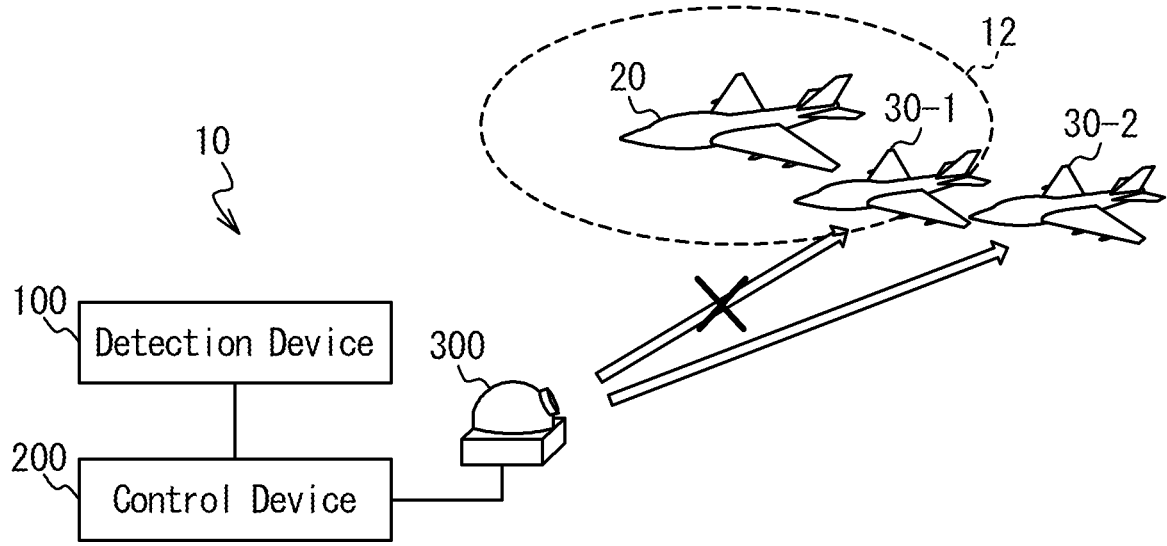
FIG. 1 is a schematic diagram to explain an overview of a threat coping system according to an embodiment.

As shown in FIG. 1, a threat coping system 10 according to an embodiment copes with coping targets 30 (including a first coping target 30-1 and a second coping target 30-2) that are a threat. The threat coping system 10 sets a no-coping area 12 around a no-coping target 20 that is not to cope with such as a passenger plane. The threat coping system 10 is configured to suppress influences to the no-coping area 12 when coping with the coping targets 30. For this reason, the threat coping system 10 does not cope with the first coping target 30-1 that exists in the no-coping area 12 and copes with the second coping target 30-2 that is outside the no-coping area 12, for example. The coping target 30 includes an Unmanned Aerial Vehicle (UAV), a drone and the like.

As a result, the threat coping system 10 suppress damages to a no-coping target 20 when coping with coping targets 30. The threat coping system 10 copes with the coping targets 30 by use of devices such as a Direct-Energy Weapon (DEW), a machine gun, an anti-aircraft missile, for example. Those devices bring damages to moving bodies that exist around the coping targets 30. For example, in case of a DEW, coping energy may penetrate through a coping target 30 and affect a moving body that exists behind the coping target 30. In case of a machine gun, a bullet that missed a coping target 30 may affect a moving body that exists around the coping target 30. In case of an anti-aircraft missile, an explosion of a coping target 30 may affect a moving body that exists around. The threat coping system 10 suppresses influence to surroundings due to coping with coping targets 30 by setting a no-coping area 12. It should be noted that a DEW includes a laser weapon, a High-Power Microwave (HPM) weapon, an Electromagnetic Pulse (EMP) weapon, and the like.

The threat coping system 10 is provided with a detection device 100, a control device 200 and a threat coping device 300. The detection device 100 detects a moving body around it and transmits detection data obtained by detection to the control device 200. The control device 200 controls the threat coping device 300 and generates, based on the detection data, a coping signal that instructs to cope with a coping target 30. The threat coping device 300 copes with the coping target 30 based on the coping signal. The control device 200 is electrically connected to the detection device 100 and the threat coping device 300, wiredly or wirelessly, to transmit and receive various data.

The detection device 100 detects a moving body included in a preset detection area and generates detection data that indicates information of the detected moving body. The detection data include, for example, data that indicates a shape, a location, a speed, a travelling direction and the like of the moving body. The detection device 100 includes various sensors such as an optical camera, a Light Detection And Ranging (LIDAR), a radar device, a transponder receiver (for example, a device that receives a signal from an Air Traffic Control (ATC) transponder), an Identification Friend or Foe (IFF), for example. The optical camera, the LIDAR, the radar device and the transponder receiver detect for example a shape, a location, a speed, a travelling direction or the like of a moving body. The IFF detects for example an affiliation or the like of a moving body.

Figure 2:
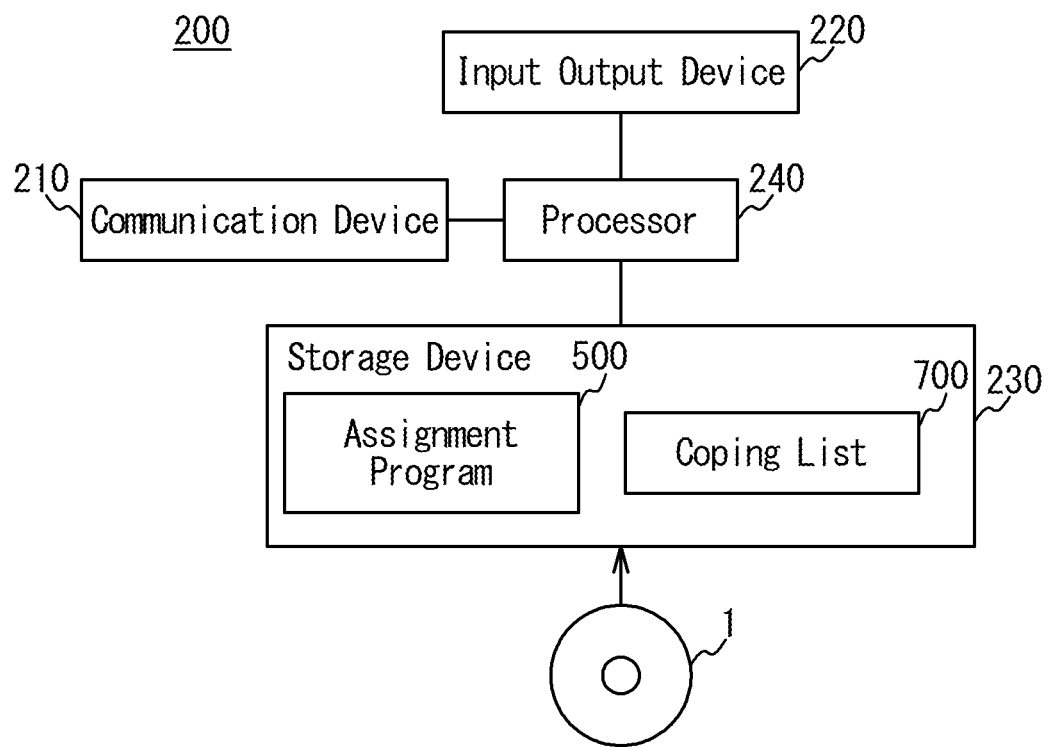
FIG. 2 is a configuration diagram of a control device according to an embodiment.

As shown in FIG. 2, the control device 200 is provided with a communication device 210, an input output device 220, a storage device 230 and a processor 240. The control device 200 decides a coping target 30 to cope with based on the detection data generated by the detection device 100 and instructs the threat coping device 300 to cope with the determined coping target 30.

The communication device 210 is connected to the detection device 100 and the threat coping device 300, and performs communication with the detection device 100 and the threat coping device 300. The communication device 210 transfers data received from the detection device 100 and the threat coping device 300 to the processor 240. In addition, the communication device 210 transfers signals generated by the processor 240 to the detection device 100 and the threat coping device 300. The communication device 210 includes, for example, various interfaces such as a Network Interface Card (NIC) and a Universal Serial Bus (USB).

The input output device 220 receives information for the processor 240 to execute a process. In addition, the input output device 220 outputs a result of the process executed by the processor 240. The input output device 220 includes a variety of input devices and output devices, and for example, includes a keyboard, a mouse, a microphone, a display, a speaker, a touch panel or the like.

The storage device 230 stores various data to control the threat coping device 300 such as an assignment program 500 and a coping list 700. The storage device 230 is used as a non-transitory tangible storage medium that stores the assignment program 500. The assignment program 500 may be provided as a computer program product stored in a computer-readable recording medium 1, or may be provided as a computer program product downloadable from a server.

The processor 240 performs various data processes to control the threat coping device 300. The processor 240 reads out the assignment program 500 from the storage device 230 and executes it to generate a coping signal to cope with the coping target 30. For example, the processor 240 includes a Central Processing Unit (CPU) or the like.

Figure 3:
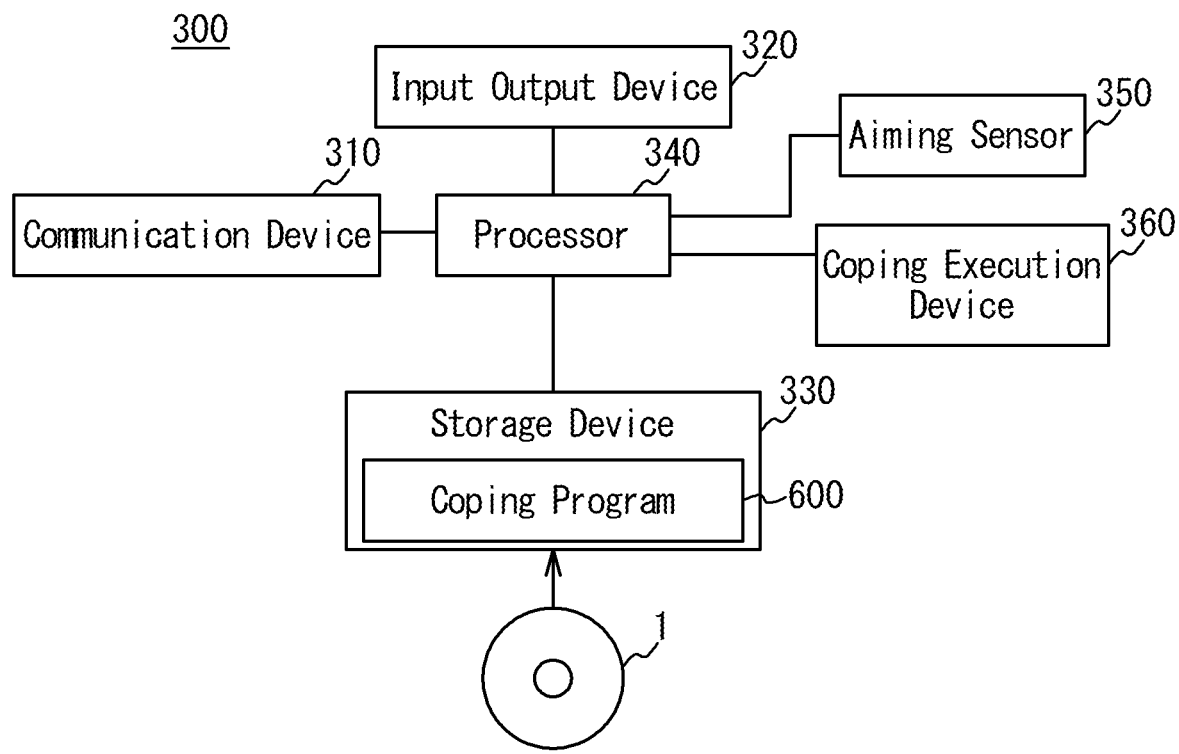
FIG. 3 is a configuration diagram of a threat coping device according to an embodiment.

As shown in FIG. 3, the threat coping device 300 is provided with a communication device 310, an input output device 320, a storage device 330, a processor 340, an aiming sensor 350 and a coping execution device 360. The threat coping device 300 copes with the coping target 30 based on the coping signal generated by the control device 200.

The communication device 310 is connected to the control device 200 and performs communication with the control device 200. The communication device 310 transfers data received from the control device 200 to the processor 340. In addition, the communication device 310 transfers a signal generated by the processor 340 to the control device 200. The communication device 310 includes, for example, various interfaces such as a NIC or a USB. In addition, the communication device 310 may be connected to the detection device 100 and perform communication with the detection device 100.

The input output device 320 receives information for the processor 340 to execute a process. In addition, the input output device 320 outputs a result of a process executed by the processor 340. The input output device 320 includes a variety of input devices and output devices, and for example includes a keyboard, a mouse, a microphone, a display, a speaker, a touch panel or the like.

The storage device 330 stores various data to cope with the coping target 30, such as a coping program 600. The storage device 330 is used as a non-transitory tangible storage medium that stores the coping program 600. The coping program 600 may be provided as a computer program product stored in a computer-readable recording medium 1, or may be provided as a computer program product downloadable from a server. The assignment program 500 and the coping program 600 may be stored in different recording media 1.

The processor 340 performs various data processes to cope with the coping target 30. The processor 340 reads out the coping program 600 from the storage device 330 and execute it. For example, the processor 340 includes a CPU or the like.

The aiming sensor 350 is used when the threat coping device 300 copes with the coping target 30. The aiming sensor 350 detects a location of the coping target 30 when the threat coping device 300 copes with the coping target 30. Data that indicates the detected location is transmitted to the processor 340.

The coping execution device 360 copes with the coping target 30 based on an instruction from the processor 340. For example, when the coping execution device 360 is a DEW, energy is irradiated to the coping target 30. In addition, when the coping execution device 360 is an anti-aircraft missile system, an anti-aircraft missile is launched to the coping target 30. When the coping execution device 360 is a machine gun, bullets are fired to the coping target 30.

Figure 4:
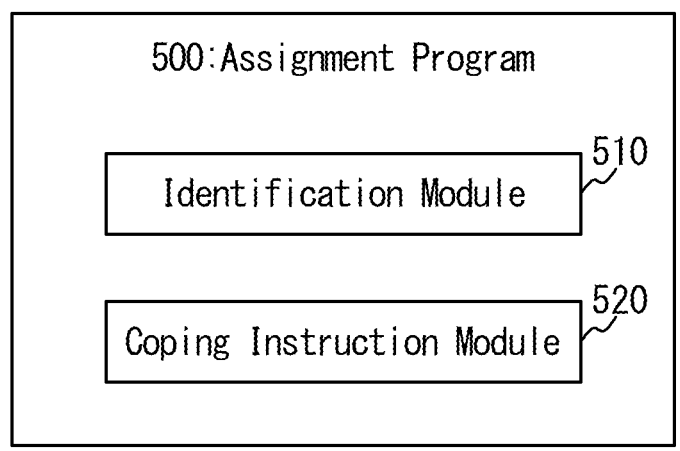
FIG. 4 is a configuration diagram of an assignment program according to an embodiment.

As shown in FIG. 4, the assignment program 500, that is executed in the control device 200, is provided with an identification module 510 and a coping instruction module 520. The identification module 510 identifies a coping target 30 and a no-coping target 20 from the detected moving bodies, based on the detected data generated by the detection device 100. In addition, the identification module 510 sets a no-coping area 12 based on the detection data of the identified no-coping target 20. The coping instruction module 520 generates a coping signal to cope with the coping target 30, based on the detection data of the coping target 30 and the no-coping area 12.

Figure 5:
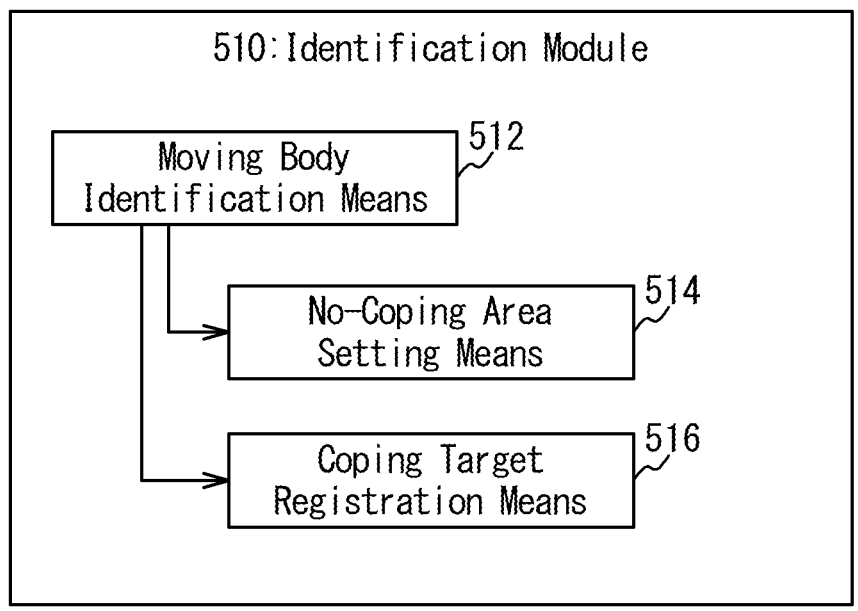
FIG. 5 is a configuration diagram of an identification module according to an embodiment.

As shown in FIG. 5, the identification module 510 is provided with a moving body identification means 512, a no-coping area setting means 514 and a coping target registration means 516. The moving body identification means 512 identifies a no-coping target 20 and a coping target 30 included in the moving bodies identified by the detection device 100, based on the detection data generated by the detection device 100. The no-coping area setting means 514 sets a no-coping area 12 for a moving body identified as a no-coping target 20. The coping target registration means 516 registers information of a moving body, that is identified as a coping target 30, as a coping target 30 in the coping list 700.

Figure 6:
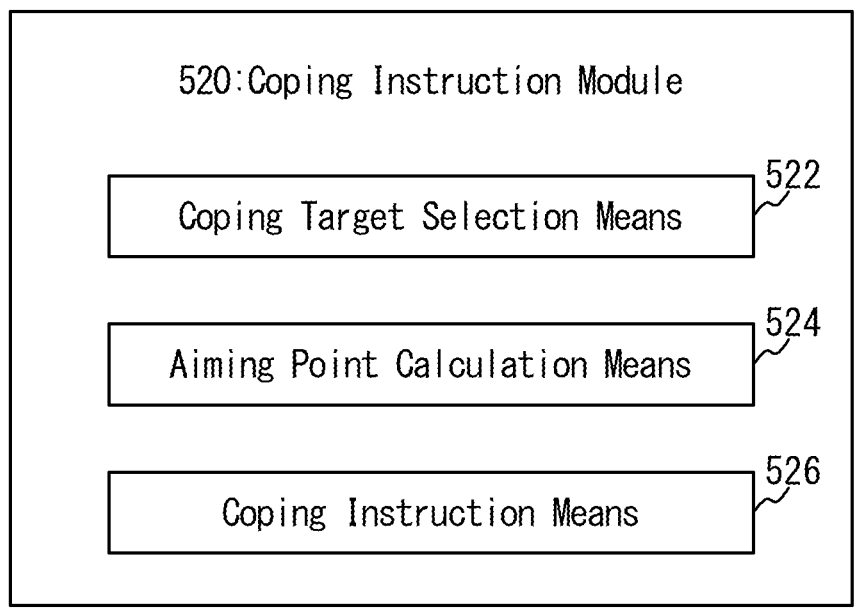
FIG. 6 is a configuration diagram of a coping instruction module according to an embodiment.

As shown in FIG. 6, the coping instruction module 520 is provided with a coping target selection means 522, an aiming point calculation means 524 and a coping instruction means 526. The coping target selection means 522 selects a coping target 30 to cope with from the coping list 700 in which coping targets 30 are registered. The aiming point calculation means 524 calculates an aiming point at a moment of coping with the selected coping target 30. The aiming point indicates, when coping by use of an anti-aircraft missile for example, a meeting point of the coping target 30 and the anti-aircraft missile. When coping by use of a DEW, the aiming point indicates a location where the energy is irradiated. The coping instruction means 526 determines whether to cope with the coping target 30 or not based on the calculated aiming point and the no-coping area 12 set by the identification module 510. The coping instruction means 526 generates, when it determined to cope with the coping target 30, a coping signal to cope with the coping target 30.

Figure 7:
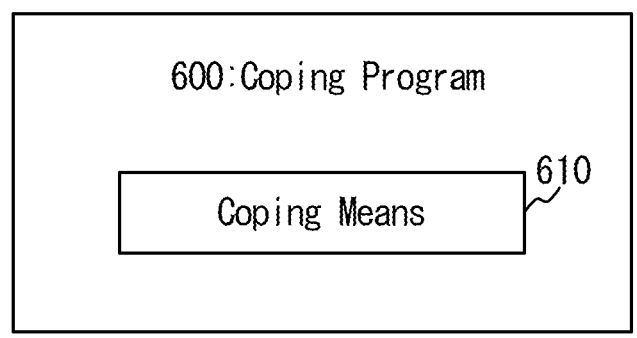
FIG. 7 is a configuration diagram of a coping program according to an embodiment.

As shown in FIG. 7, the coping program 600, that is executed in the threat coping device 300, is provided with a coping means 610. The coping means 610 copes with the coping target 30 based on the coping signal generated by the assignment program 500.

(Operation of Threat Coping System)

Figure 8:
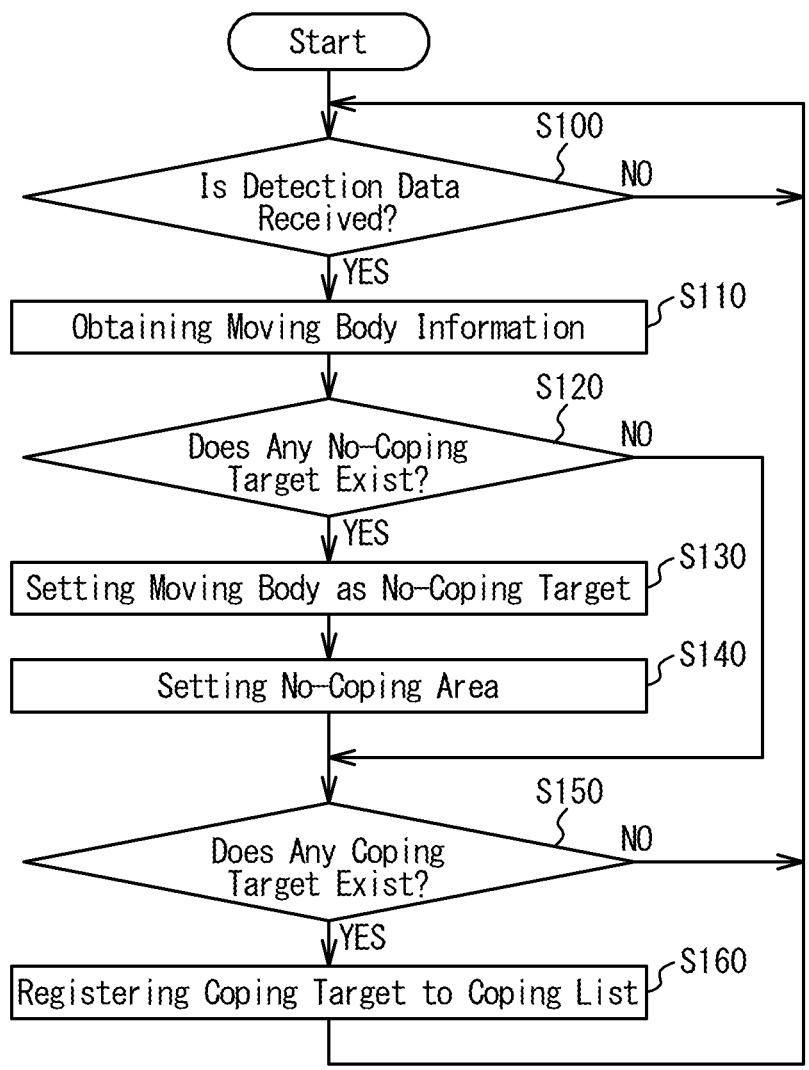
FIG. 8 is a flowchart that shows processes executed by the identification module according to an embodiment.

The identification module 510 makes the processor 240 execute processes shown in FIG. 8. In a step S100, the processor 240 determines whether detection data generated by the detection device 100 are received or not. When the detection data are not received (step S100: NO), the processor 240 waits until the detection data are received. When the detection data are received (step S100: YES), the processor 240 executes a process of a step S110.

In the step S110, the processor 240 obtains information of a moving body detected by the detection device 100 from the detection data. The detection data includes information of the moving body detected by the detection device 100, such as a size, a shape, a location, a speed, a travelling direction or the like. The processor 240 obtains those pieces of information from the detection data.

In a step S120, the processor 240 determines whether any no-coping target 20 exists or not among moving bodies detected by the detection device 100. The storage device 230 preliminary stores information of no-coping targets 20 such as a size, a shape, a flying speed, a flying route, a model, an affiliation or the like. The processor 240 compares information of the moving bodies obtained from the detection data and information of the no-coping targets 20 stored in the storage device 230. When information of a moving body obtained from the detection data matches information of a no-coping target 20 stored in the storage device 230, the processor 240 determines that this moving body corresponds to the no-coping target 20. In addition, when a portion of information of a moving body obtained from the detection data matches a portion of information of a no-coping target 20, the processor 240 may determine that this moving body corresponds to the no-coping target 20. Furthermore, a matching degree that indicates a degree of matching between information of a moving body and information of a no-coping target 20 may be calculated. When this matching degree is larger than a desired reference value, the processor 240 determines that the moving body corresponds to the no-coping target 20. When any moving body corresponding to a no-coping target 20 exists (step S120: YES), the processor 240 executes a process of a step S130. When no moving body corresponding to any no-coping target 20 exists (step S120: NO), the processor 240 executes a process of a step S150.

In the step S130, the processor 240 sets the moving body, that is determined to correspond to a no-coping target 20, as a no-coping target 20. As the no-coping area 12 moves in accordance with a move of this moving body, a setting of the no-coping area 12 is facilitated by setting the moving body as a no-coping target 20.

In a step S140, the processor 240 sets the no-coping area 12 based on information of the moving body that is set as a no-coping target 20. The no-coping area 12 indicates an area where a distance from the no-coping target 20 is shorter than or equal to a desired distance. For example, the no-coping area 12 may be an area where a distance from an outer edge of the no-coping target 20 is shorter than a desired distance. In addition, the no-coping area 12 may be an area where a distance from a center of the no-coping target 20 is shorter than a desired distance. The desired distance may be determined in accordance with a model of the no-coping target 20.

In a step S150, the processor 240 determines whether any coping target 30 exists among the moving bodies detected by the detection device 100 or not. The processor 240 determines whether a moving body, that is not set as no-coping targets 20, corresponds to a coping target 30 or not, based on information of moving bodies obtained in the step S110. The processor 240 estimates a category of the moving body, such as a drone, a UAV or the like, from a size, a shape or the like of the moving body. The processor 240 calculates a threat level of the moving body based on the category, the speed and the travelling direction of the moving body. When the calculated threat level is higher than a desired reference value, the processor 240 determines that the moving body corresponds to a coping target 30. When any moving body corresponding to a coping target 30 exists (step S150: YES), the processor 240 executes a process of a step S160. When no moving body corresponding to a coping target 30 exists (step S150: NO), the processor 240 returns to the step S100 and repeats processes.

Figure 9:
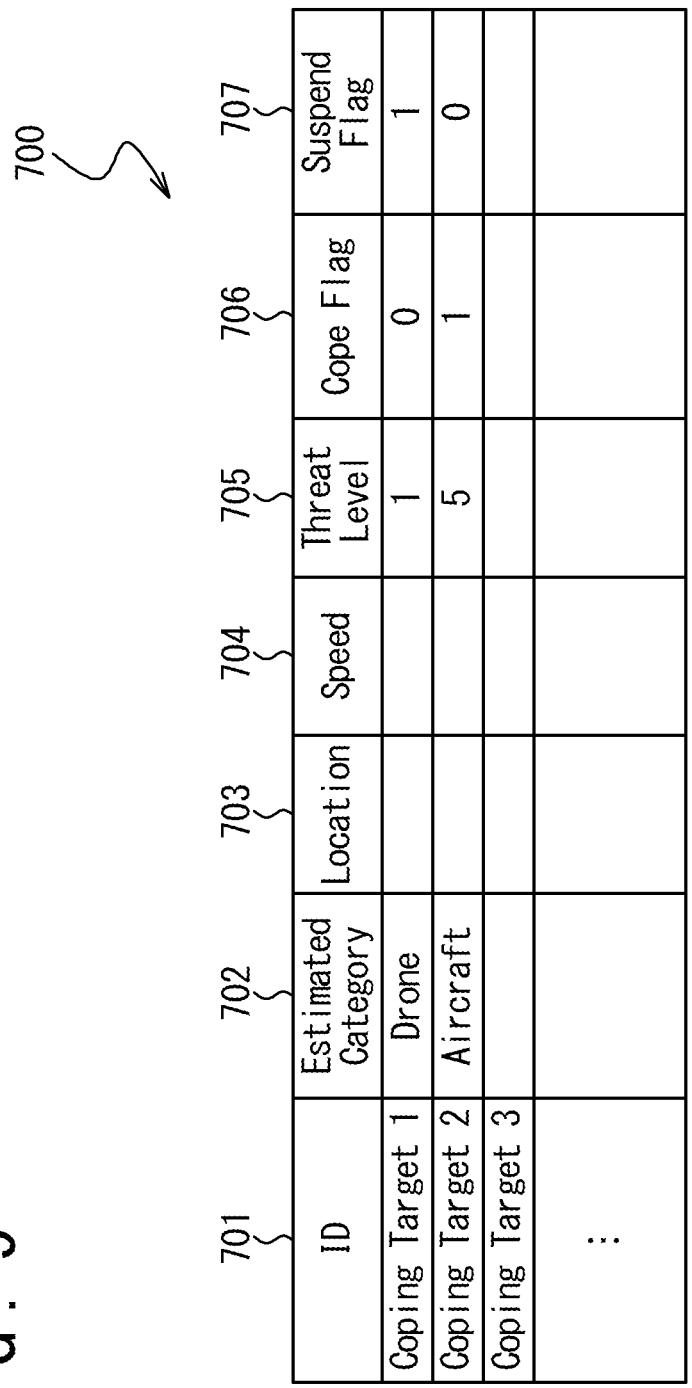
FIG. 9 is a diagram to explain a coping list according to an embodiment.

In the step S160, the processor 240 registers the moving body that corresponds to a coping target 30 to a coping list 700 shown in FIG. 9. The moving body registered to the coping list 700 corresponds to the coping target 30 to cope with. The coping list 700 stores, for example, an ID 701, an estimated category 702, a location 703, a speed 704, a threat level 705, a cope flag 706 and a suspend flag 707 of each moving body. The ID 701 is data to identify the moving body detected by the detection device 100. The estimated category 702 is data that indicates a category of the moving body estimated based on information of the moving body such as a size, a shape, a speed or the like. The location 703 is data that indicates a location of the moving body. The speed 704 is data that indicates a speed of the moving body and that indicates a travelling direction and a magnitude of the speed. The threat level 705 is data that indicates a degree to which the moving body affects defense facilities or the like. For example, the threat level 705 stores the threat level calculated in the step S150. The cope flag 706 is data that indicates that the cope target 30 is to preferentially cope with. The cope flag 706 is set when the corresponding coping target 30 is determined to be preferentially coped with. The suspend flag 707 is data that indicates that coping with the corresponding coping target 30 affects the no-coping area 12. For example, a desired value (for example: "1") is registered to the cope flag 706 and the suspend flag 707 when they are set and another value (for example: "0") is registered when the setting is canceled. In the step S160, when the coping target 30 is registered to the coping list 700, the processor 240 returns to the step S100 and repeats processes.

As described above, the identification module 510 identifies a no-coping target 20 and a coping target 30 and sets a no-coping area 12 in accordance with the no-coping target 20. It should be noted that the moving body identification means 512 executes the process of the step S100, the process of the step S110, the process of the step S120 and the process of the step S150. The no-coping area setting means 514 executes the process of the step S130 and the process of the step S140. The coping target registration means 516 executes the process of the step S160.

Figure 10:
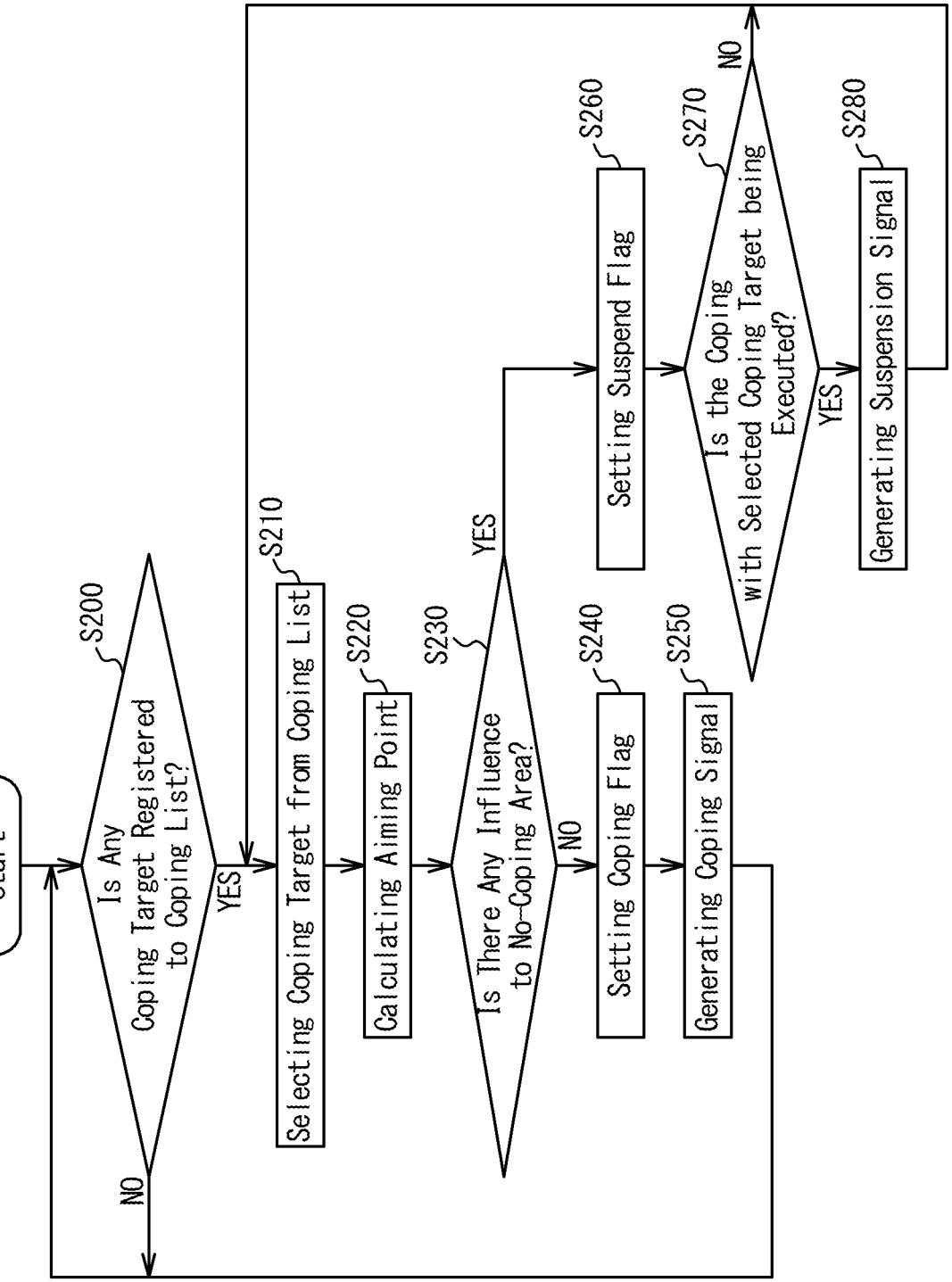
FIG. 10 is a flowchart that shows processes executed by the coping instruction module according to an embodiment.

The coping instruction module 520 makes the processor 240 execute processes shown in FIG. 10. In a step S200, the processor 240 verifies whether any coping target 30 is registered to the coping list 700 or not. When no coping target 30 is registered to the coping list 700 (step S200: NO), the processor 240 waits until a coping target 30 is registered. When any coping target 30 is registered to the coping list 700 (step S200: YES), the processor 240 executes a process in a step S210.

In the step S210, the processor 240 selects a coping target 30 to cope with from the coping list 700 based on a desired selection condition. The selection condition may include, for example, an earliest arrival to a predetermined location (for example, a location of a protected object). In this case, the processor 240 predicts a movement route of a coping target 30 registered to the coping list 700 and calculates an estimated arrival time when the coping target 30 reaches the protected object based on the predicted movement route. A coping target 30 of which the calculated estimated arrival time is the earliest is selected.

The selection condition may include a closest distance from a predetermined location such as the location of the protected object. In this case, the processor 240 calculates a distance from the location of the coping target 30 to the location of the protected object based on the location of the coping target 30 registered to the coping list 700. A coping target 30 of which the calculated distance is the shortest is selected.

The selection condition may include a highest threat level 705 registered to the coping list 700. In this case, the processor 240 selects a coping target 30 of which the threat level 705 is the highest from the coping list 700.

The selection condition may include a setting of the cope flag 706 registered to the coping list 700. By selecting a coping target 30 of which the cope flag 706 is set, a coping target 30 that is determined to cope with can be preferably selected.

The selection condition may include selecting a coping target 30 that is currently coped with. In this case, the storage device 230 stores data of the coping target 30 that is currently coped with, such as the ID 701. The processor 240 reads out data of the coping target 30 that is currently coped with from the storage device 230 and selects the coping target 30 that corresponds to the read data. The data that indicates the coping target 30 that is currently coped with may be included in the coping list 700.

The selection condition may include a non-setting of the suspend flag 707 registered to the coping list 700. By selecting a coping target 30 of which the suspend flag 707 is not set, a coping target 30 that affects the no-coping area 12 is excluded. In this case, the processor 204 may cancel the setting of the suspend flag 707 when a desired time has passed since it was set.

The selection condition may be an arbitrary combination of the above-described selection conditions. For example, the processor 240 may calculate a selection priority based on the above-described selection conditions and select a coping target 30 based on the calculated selection priority. For example: a first selection priority is set in accordance with an order of earlier estimated arrival time of reaching the protected object; a second selection priority is set in accordance with an order of higher threat level 705; and a selection priority as a whole is calculated based on this first selection priority and this second selection priority. In addition, the processor 240 may calculate a third selection priority based on a distance from a predetermined location to the location of the coping target 30 and calculate the selection priority as a whole based on the first selection priority, the second selection priority and the third selection priority. In addition, the first selection priority may be set in accordance with a time from a current time to the estimated arrival time. The second selection priority may be set in accordance with the threat level 705.

When the coping target 30 is selected, the processor 240 calculates, in a step S220, an aiming point to cope with the selected coping target 30. The aiming point is calculated based on a performance of the threat coping device 300 and information of the coping target 30 such as a speed, a travelling direction or the like. The performance of the threat coping device 300 includes, for example, a range distance, a time from a start of coping to affecting the aiming point (for example, a time from launching an anti-aircraft missile to reaching the aiming point), or the like.

In a step S230, the processor 240 determines whether there is any influence to the no-coping area 12 by coping with the calculated aiming point or not. When there is no influence to the no-coping area 12 by coping with the calculated aiming point (step S230: NO), the processor 240 executes a process of a step S240 to cope with the coping target 30. When there is an influence to the no-coping area 12 by coping with the aiming point (step S230: YES), the processor 240 executes a process of a step S260 to prohibit coping with the coping target 30. A method of determining whether there is any influence to the no-coping area 12 will be described later.

In the step S240, the processor 240 sets a cope flag 706 corresponding to the selected coping target 30. For example, the processor 240 registers a predetermined value such as "1" to the cope flag 706 corresponding to the selected cope flag 706 in the coping list 700.

In a step S250, the processor 240 generates a coping signal to cope with the selected coping target 30. The coping signal includes a signal that indicates information of the selected coping target 30. For example, the coping signal includes a signal that indicates data included in the coping list 700. In particular, the coping signal includes a signal that indicates the ID 701, the location 703, the speed 704 and the like corresponding to the selected coping target 30. When the processor 240 generates the coping signal, the threat coping device 300 copes with the coping target 30 based on the coping signal. For this reason, the processor 240 stores data, that indicates that the threat coping device 300 is currently coping with the selected coping target 30, in the storage device 230. The processor 240 returns, after generating the coping signal, to the process of the step S200 and repeats processes.

When there is an influence to the no-coping area 12 (step S230: YES), the processor 240 sets the suspend flag 707 corresponding to the selected coping target 30 in the step S260. For example, the processor 240 registers a predetermined value such as "1" to the suspend flag 707 corresponding to the selected coping target 30 in the coping list 700.

In a step S270, the processor 240 determines whether the threat coping device 300 is coping with the selected coping target 30 or not. The processor 240 reads out data of the coping target 30 which is currently coped with from the storage device 230. The processor 240 determines whether the threat coping device 300 is currently coping with the selected coping target 30, based on the read data. When the threat coping device 300 is currently coping with the selected coping target 30 (step S270: YES), the processor 240 executes a process of a step S280 to suspend the coping. When the threat coping device 300 is not currently coping with the selected coping target 30 (step S270: NO), the processor 240 returns to the process of the step S210 and repeats processes.

In the step S280, the processor 240 generates a suspension signal to suspend the coping with the selected coping target 30. The suspension signal may include a signal that indicates information of the selected coping target 30. The processor 240 returns, after generating the suspension signal, to the process of the step S210 and repeats processes.

As described above, the coping instruction module 520 determines the coping target 30 with which the threat coping device 300 copes. In addition, the coping instruction module 520 suspends coping with the coping target 30 based on the no-coping area 12. It should be noted that the coping target selection means 522 executes the process of the step S200 and the process of the step S210. The aiming point calculation means 524 executes the process of the step S220. The coping instruction means 526 executes the processes of the steps S230 to S280.

Figure 11:
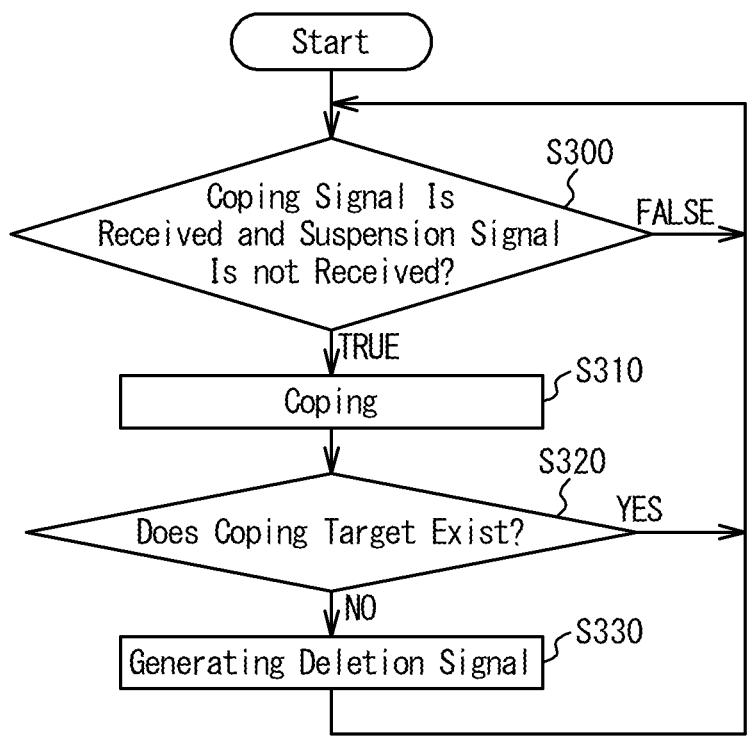
FIG. 11 is a flowchart that shows processes executed by the coping program according to an embodiment.

The coping program 600 makes the processor 340 of the threat coping device 300 execute processes shown in FIG. 11. In a step S300, the processor 340 verifies that the coping signal that indicates to cope with is received and that the suspension signal that indicates to suspend the coping is not received. When the coping signal is received and the suspension signal is not received (step S300: TRUE), the processor 340 executes a process of a step S310 to cope with the coping target 30. When the coping signal is not received or the suspension signal is received (step S300: FALSE), the processor 340 repeatedly executes the step S300.

In the step S310, the processor 340 performs a coping with the coping target 30 based on the coping signal. The processor 340 obtains a current location of the coping target 30 to perform the coping with the coping target 30. As the coping signal includes a signal that indicates information of the coping target 30 to cope with, the processor 340 extracts information of the coping target 30 to cope with, such as a location of the coping target 30, from the coping signal. The processor 340 obtains the current location of the coping target 30 by use of the aiming sensor 350, based on the extracted location of the coping target 30. For example, the processor 340 controls the aiming sensor 350 to detect a moving body that exists at the extracted location of the coping target 30. The processor 340 determines whether the detected moving body matches the coping target 30 or not and, in case of matching, copes with the detected moving body as the coping target 30. It should be noted that the current location of the coping target 30 may be obtained from the detection device 100.

In a step S320, the processor 340 determines whether the coping target 30 exists or not. For example, while the threat coping device 300 is coping with the coping target 30, the aiming sensor 350 continues detecting the coping target 30. When the aiming sensor 350 is detecting the coping target 30, the processor 340 determines that the coping target 30 exists. When it is determined that the coping target 30 exists (step S320: YES), the processor 340 returns to the process of the step S300 and repeats processes. When the aiming sensor 350 is not detecting the coping target 30, the processor 340 determines that the coping target 30 does not exist. When it is determined that the coping target 30 does not exist (step S320: NO), the processor 340 executes a process of a step S330.

In the step S330, the processor 340 generates a deletion signal to delete a coping target 30 which has been coped from the coping list 700. A deletion signal includes, for example, a signal that indicates the ID 701 of the coping target 30 to delete. The control device 200 deletes, based on the deletion signal, the corresponding coping target 30 from the coping list 700. The processor 340 after generation of the deletion signal returns to the step S300 and repeats processes.

As described above, the coping program 600 copes with a coping target 30 based on a coping signal from the control device 200 and performs suspension of coping based on a suspension signal from the control device 200. Therefore, the threat coping system 10 suppresses a coping with a coping target 30 that may affect a no-coping area 12 and can reduce misfiring to no-coping targets 20.

(Determination Whether there is Influence to a No-Coping Area)

A determination whether there is influence to a no-coping area 12 is performed based on a desired influence condition. When the influence condition is satisfied, the processor 240 determines that there is an influence to the no-coping area 12 when the threat coping device 300 copes with the coping target 30. When the influence condition is not satisfied, the processor 240 determines that there is no influence to the no-coping area 12 even if the threat coping device 300 copes with the coping target 30.

Figure 12:
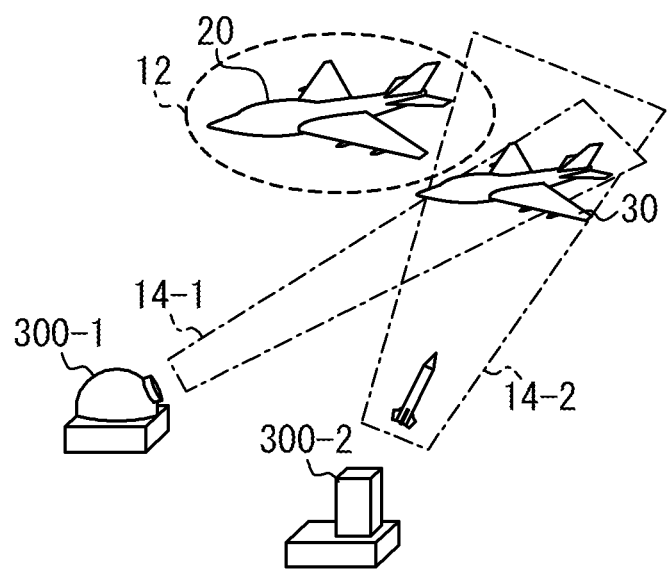
FIG. 12 is a diagram to explain a method to determine a presence or an absence of an influence to a no-coping area.

The influence condition includes an overlapping of a range of effect of a weapon with which the threat coping device 300 is provided to the no-coping area 12. In particular, as shown in FIG. 12, a first threat coping device 300-1 affects a first range of effect 14-1 and a second threat coping device 300-2 affects a second range of effect 14-2. As the first range of effect 14-1 does not overlap the no-coping area 12, it is determined that there is no influence to the no-coping area 12 even if the first threat coping device 300-1 copes with the coping target 30. On the other hand, as the second range of effect 14-2 overlaps the no-coping area 12, it is determined that there is an influence to the no-coping area 12 when the second threat coping device 300-2 copes with the coping target 30.

Figure 13:
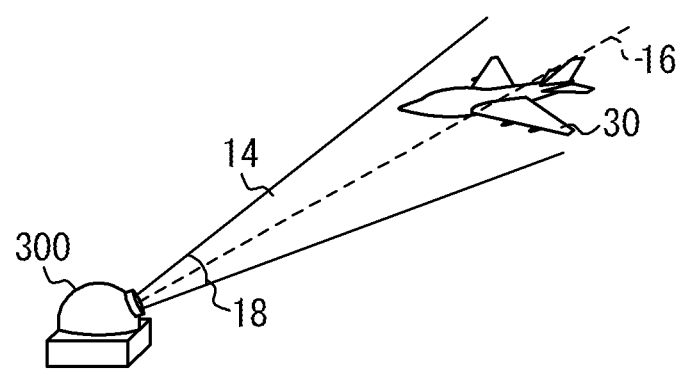
FIG. 13 is a diagram to explain a range of effect by the threat coping device according to an embodiment.
Figure 14:
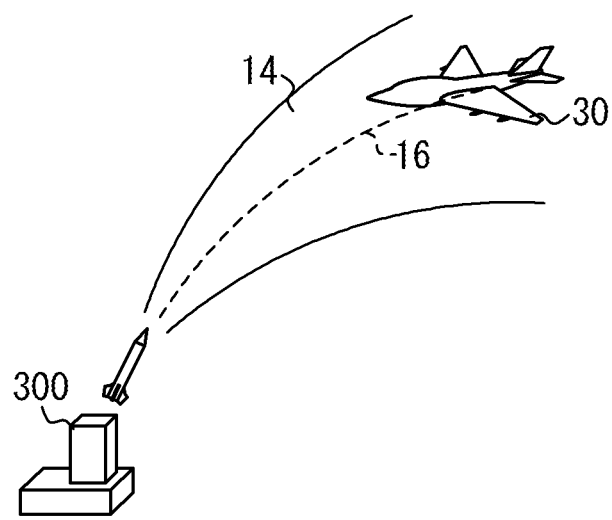
FIG. 14 is a diagram to explain a range of effect by the threat coping device according to an embodiment.

The range of effect 14 includes a coping route (for example: line of fire) where a coping object (for example: light energy, electromagnetic energy, a bullet, a missile or the like) passes to defeat the coping target 30. This coping route is different depending on the weapon with which the threat coping device 300 is provided. In case of a DEW, a machine gun or the like, as shown in FIG. 13, the coping route 16 is extended on a straight line from the threat coping device 300 toward the aiming point. In case of an anti-aircraft missile system or the like, as shown in FIG. 14, the coping route 16 is not extended on a straight line but includes a curve. In addition, as shown in FIG. 13, when the coping route 16 is extended on a straight line, the range of effect 14 includes a conical area with the threat coping device 300 as an apex. An apex angle 18 of this range of effect 14 is different depending on the weapon with which the threat coping device 300 is provided. For this reason, the range of effect 14 may include a conical area having an apex angle 18 in accordance with the threat coping device 300.

When the threat coping device 300 is provided with a DEW, the influence condition may include a non-exceeding of an intensity of the irradiated energy beyond a predetermined value in the no-coping area 12. For example, when the threat coping device 300 is provided with a laser weapon, the influence condition may include a non-exceeding of laser intensity beyond a predetermined value in the no-coping area 12. In addition, when the threat coping device 300 is provided with a HPM weapon, the influence condition may include a non-exceeding of electric field strength beyond a predetermined value in the no-coping area 12. In addition, the influence condition may include a non-exceeding of an integrated value of energy irradiated to the no-coping area 12 beyond a predetermined value.

When the threat coping device 300 is provided with a machine gun, the influence condition may include a non-exceeding of a probability in which a bullet reaches the no-coping area 12 beyond a predetermined value.

When the threat coping device 300 is provided with an anti-aircraft missile system, the influence condition may include a non-overlapping of the range of effect 14, where there is an influence when an anti-aircraft missile hits the coping target 30, to the no-coping area 12. An anti-aircraft missile explodes and affects the surroundings when hitting the coping target 30. By not overlapping the affected area to the no-coping area 12, influence to the no-coping area 12 is reduced.

Variation Example 1 of No-Coping Area

The no-coping area 12 may be different depending on the no-coping target 20. For example, the no-coping area 12 may be decided depending on a size and a speed of the no-coping target 20. In particular, the no-coping area 12 indicates an area where a distance from the no-coping target 20 is shorter than or equal to a desired distance. This desired distance may be decided depending to a length, a speed or the like of the no-coping target 20. For example, the desired distance may be proportional to a length of the no-coping target 20. In other words, the longer the length of the no-coping target 20, the wider the no-coping area 12 may be set. In particular, as shown in Equation (1), the desired distance may be a value in which the length of the no-coping target 20 is multiplied by an arbitrary coefficient. L indicates a desired distance and $C_L$ indicates a length of the no-coping target 20. $A_1$ indicates a coefficient.

[Equation 1]

$$L = A_1 C_L \quad (1)$$

In addition, the desired distance may be proportional to a speed of the no-coping target 20. In other words, the faster the speed of the no-coping target 20, the wider the no-coping area 12 may be set. In particular, as shown in Equation (2), the desired distance may be a value in which a speed of the no-coping target 20 is multiplied by an arbitrary coefficient. $C_V$ indicates a speed of the no-coping target 20. $A_2$ indicates a coefficient.

[Equation 2]

$$L = A_2 C_v \quad (2)$$

In addition, the desired distance may be decided based on a value calculated based on a length of the no-coping target 20 and a value calculated based on a speed of the no-coping target 20. For example, the desired distance may be a value in which two values are added, as shown in Equation (3).

[Equation 3]

$$L = A_1 C_L + A_2 C_v \quad (3)$$

As described above, by setting an area in accordance with a speed and a length of the no-coping target 20 as the no-coping area 12, misfiring to the no-coping target 20 is suppressed.

The no-coping area 12 may be decided based on a speed and a travelling direction of the no-coping target 20. For example, the no-coping area 12 may be expanded in the travelling direction of the no-coping target 20 by a distance based on the speed of the no-coping target 20. In particular, the no-coping area 12 may be expanded at a location inclined by an angle θ with respect to the travelling direction by a value in which the speed of the no-coping target 20 is multiplied by cos θ and an arbitrary coefficient.

The no-coping area 12 may be decided based on a distance corresponding to a length and a speed of the no-coping target 20 that are preliminarily registered. For example, the storage device 230 stores a distance corresponding to the length and the speed of the no-coping target 20. The processor 240 reads out the corresponding distance from the storage device 230 based on the length and the speed of the no-coping target 20. The processor 240 sets an area where a distance from the no-coping target 20 is shorter than or equal to the read distance as the no-coping area 12. Furthermore, the storage device 230 may store a distance by which the no-coping area 12 is expanded in the travelling direction, in correspondence with the speed of the no-coping target 20. The processor 240 reads out the distance by which the no-coping area 12 is expanded from the storage device 230. The processor 240 expands the no-coping area 12 in accordance with the read distance.

Variation Example 2 of No-Coping Area

Figure 15:
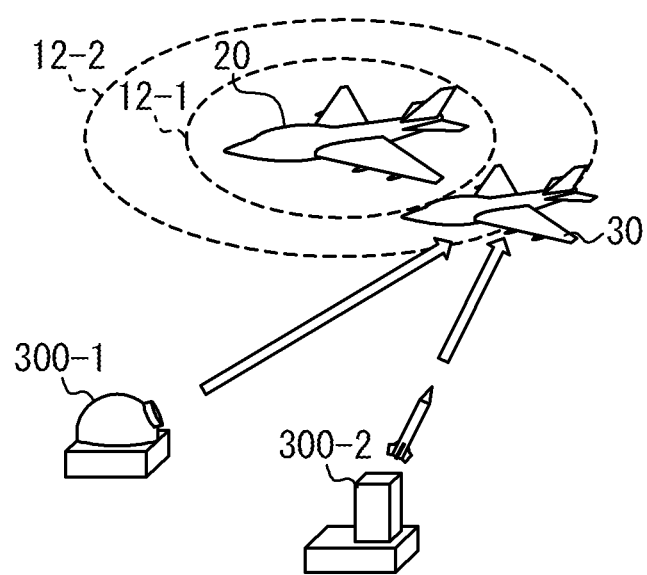
FIG. 15 is a diagram to explain the no-coping area according to an embodiment.

The no-coping area 12 may be different depending to the weapon with which the threat coping device 300 is provided. As shown in FIG. 15, a first coping area 12-1 is set when the first threat coping device 300-1 copes, and a second coping area 12-2 is set when the second threat coping device 300-2 copes.

The no-coping area 12 may be decided based on characteristics (for example, an aiming accuracy, an apex angle 18, a range of effect 14 when a coping object hits a coping target 30, or the like) of the weapon with which the threat coping device 300. In particular, the no-coping area 12 indicates an area where a distance from the no-coping target 20 is shorter than or equal to a desired distance. This desired distance may be decided depending to characteristics of the weapon with which the threat coping device 300 is provided. For example, as shown in Equation (4), the desired distance is decided based on a distance from the coping target 30 to the threat coping device 300 and the characteristics of the weapon with which the threat coping device 300 is provided. For example, the processor 240 adds a value in which the aiming accuracy of the weapon with which the threat coping device 300 is provided is multiplied by a coefficient and a value in which the apex angle 18 is multiplied by a coefficient. The desired distance may be a value obtained by multiplying the value obtained by the addition and a distance from the coping target 30 to the threat coping device 300, as shown in Equation (4). D indicates the distance from the coping target 30 to the threat coping device 300. $W_1$ indicates the aiming accuracy and $W_2$ indicates the apex angle 18. $B_1$ and $B_2$ indicate the coefficients.

[Equation 4]

$$L=D(B_1W_1+B_2W_2) \quad (4)$$

The desired distance may be decided based on a range of effect when the coping object hits the coping target 30. For example, as shown in Equation (5), the desired distance may be further added with a value in which a size of the range of effect 14 when the coping object hits the coping target 30 is multiplied by a coefficient. $W_3$ indicates the size of the range of effect 14 when the coping object hits the coping target 30, and $B_3$ indicates the coefficient.

[Equation 5]

$$L=D(B_1W_1+B_2W_2)+B_3W_3 \quad (5)$$

The desired distance may be decided further based on a length of the no-coping target 20. For example, as shown in Equation (6), the desired distance may be a value in which the value calculated based on the characteristics of the weapon with which the threat coping device 300 is provided is added with a value in which the length of the no-coping target 20 is multiplied by an arbitrary coefficient.

[Equation 6]

$$L=D(B_1W_1+B_2W_2)+B_3W_3+A_1C_L \quad (6)$$

The desired distance may be decided further based on a speed of the no-coping target 20. For example, as shown in Equation (7), the desired distance may be a value added with a value in which the speed of the no-coping target 20 is multiplied by an arbitrary coefficient.

[Equation 7]

$$L=D(B_1W_1+B_2W_2)+B_3W_3+A_1C_L+A_2C_V \quad (7)$$

The no-coping area 12 may be decided based on a speed and a travelling direction of the no-coping target 20. For example, the no-coping area 12 may be expanded in the travelling direction of the no-coping target 20 by a distance based on the speed of the no-coping target 20. In particular, the no-coping area 12 may be expanded at a location inclined by an angle θ with respect to the travelling direction, by a value in which the speed of the no-coping target 20 is multiplied by cos θ and an arbitrary coefficient.

The no-coping area 12 may be decided based on a distance registered in accordance with the threat coping device 300. The storage means 230 stores the distance corresponding to the threat coping device 300. The processor 240 reads out, based on the threat coping device 300 to set the no-coping area 12, the corresponding distance from the storage device 230. The processor 240 sets an area where a distance from the no-coping target 20 is shorter than or equal to the read distance, as the no-coping area 12. Furthermore, the storage device 230 may store a distance by which the no-coping area 12 is expanded in correspondence with the speed of the no-coping target 20. The processor 240 reads out the distance to expand the no-coping area 12 from the storage device 230. The processor 240 expands the no-coping area 12 in accordance with the read distance.

Embodiment 2

Figure 16:
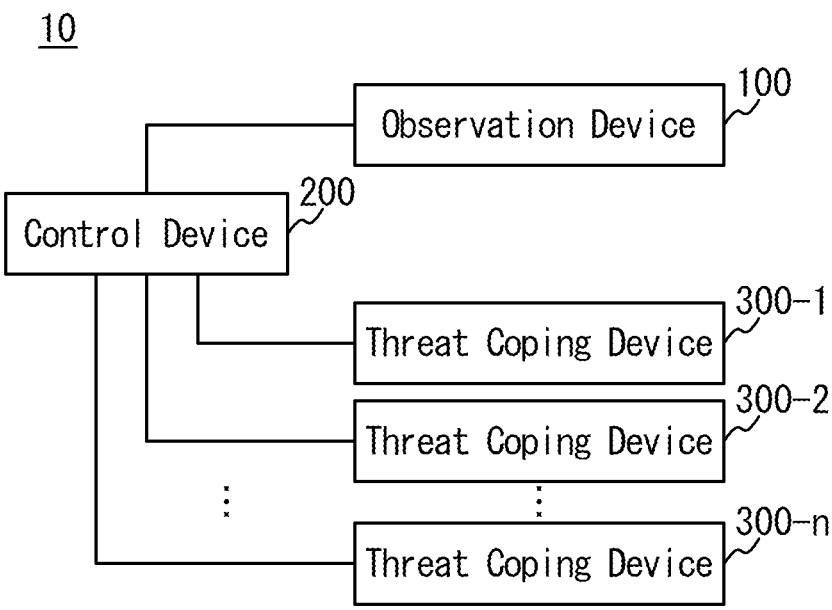
FIG. 16 is a configuration diagram of a threat coping system according to an embodiment.

As shown in FIG. 16, the threat coping system 10 may be provided with a plurality of threat coping devices 300 (a first threat coping device 300-1, a second threat coping device 300-2, . . . , a n-th threat coping device 300-$n$). The threat coping system 10 performs coping with one of detected coping targets 30, for example. Here, n is a natural number larger than or equal to 2. The configuration of the control device 200 and the configuration of the threat coping device 300 are similar to the embodiment 1 and therefore descriptions thereof will be omitted.

The assignment program 500 executed in the control device 200 is provided with the identification module 510 and the coping instruction module 520, similarly to the embodiment 1. The identification module 510 is similar to the embodiment 1 and therefore descriptions thereof will be omitted.

Figure 17:
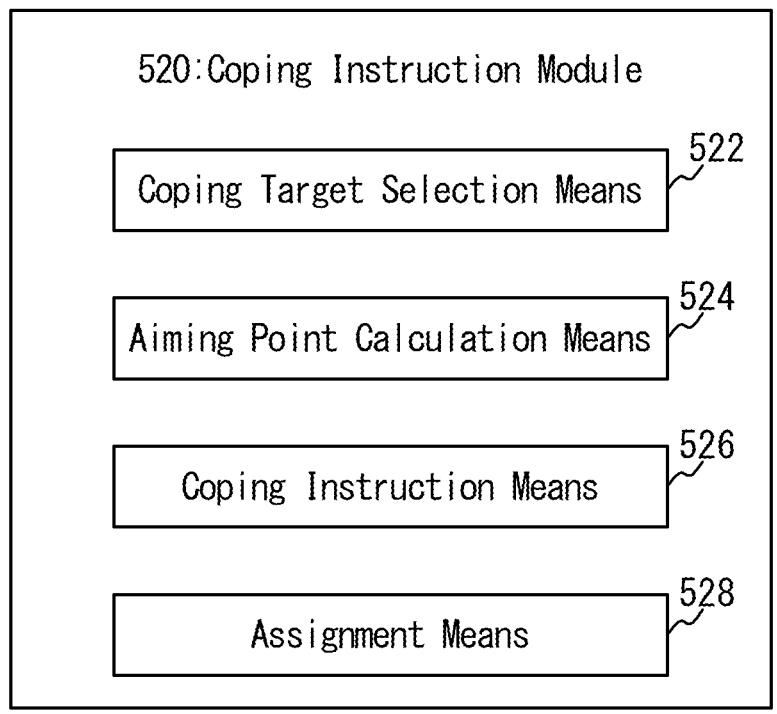
FIG. 17 is a configuration diagram of the coping instruction module according to an embodiment.

As shown in FIG. 17, the coping instruction module 520 is provided with the coping target selection means 522, the aiming point calculation means 524, the coping instruction means 526 and an assignment means 528. The coping target selection means 522, the aiming point calculation means 524 and the coping instruction means 526 function similarly to the embodiment 1. The assignment means 528 selects a threat coping device 300 to cope with the coping target 30 among the plurality of threat coping devices 300.

The coping program 600 executed in the threat coping device 300 is similar to the embodiment 1 and therefore descriptions thereof will be omitted.

(Operation of Threat Coping System)

The identification module 510 and the coping program 600 are similar to the embodiment 1 and therefore descriptions thereof will be omitted.

Figure 18:
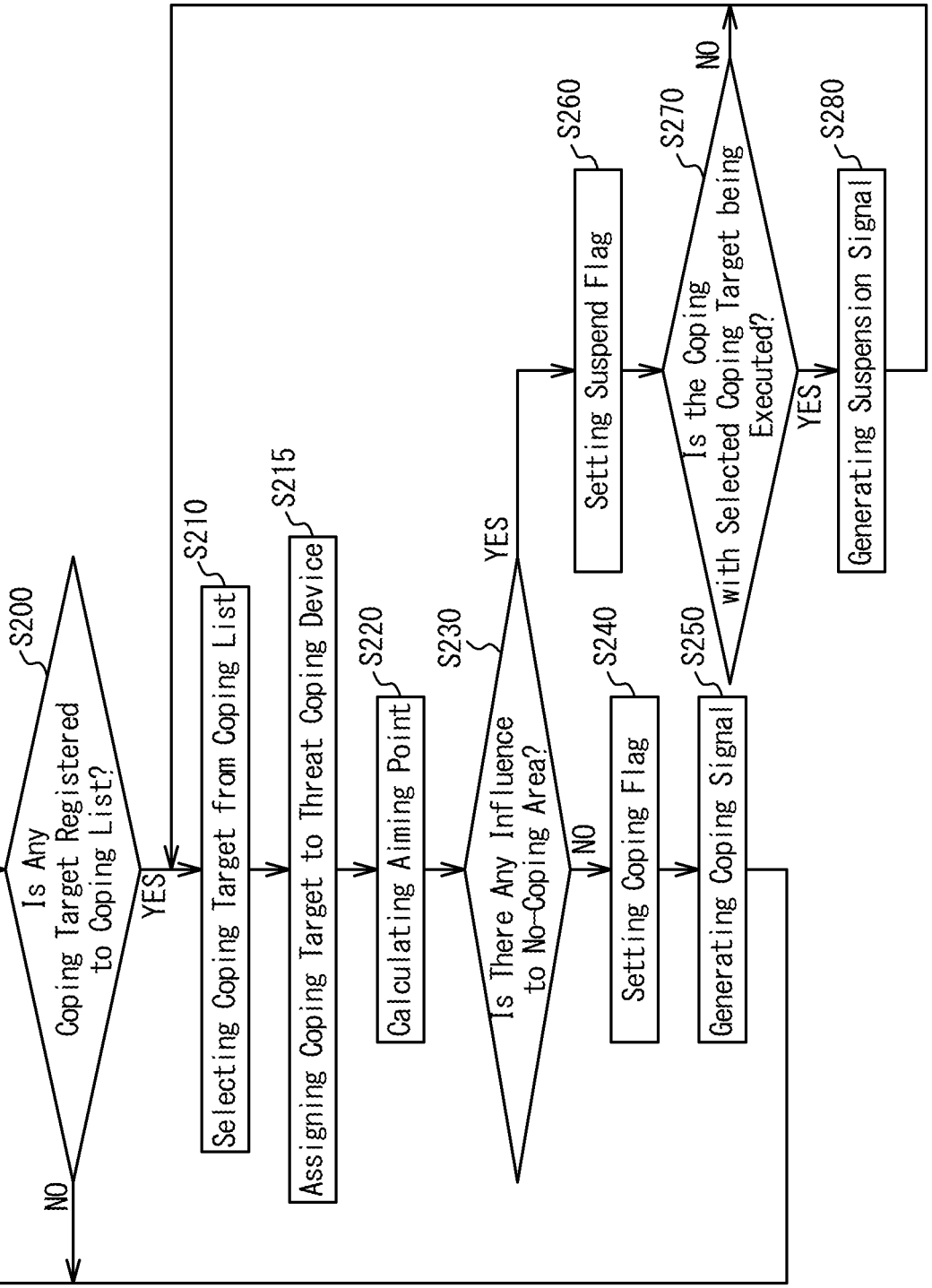
FIG. 18 is a flowchart that shows processes executed by the coping instruction module according to an embodiment.

The coping instruction module 520 makes the processor 240 execute processes shown in FIG. 18. The process of the step S200 is similar to the embodiment 1 and therefore descriptions thereof will be omitted.

In the step S210, similarly to the embodiment 1, the processor 240 selects the coping target 30 to cope with from the coping list 700, based on the desired selection condition. The selection condition may include a minimum number of the threat coping devices 300 that can cope with. The processor 240 obtains a state of the threat coping devices 300 such as locations and range from the threat coping devices 300. A number of the threat coping devices 300 that can cope with the coping target 30 is calculated based on the location of the coping target 30 and the locations and range of the threat coping devices 300. In other words, the processor 240 calculates a number of threat coping devices 300 of which the ranges include the location of the coping target 30. The coping target 30 of which the calculated number is the smallest is selected.

The selection condition may include selection conditions of the embodiment 1.

In a step S215, the processor 240 decides a threat coping device 300 to which the selected coping target 30 is assigned based on a desired assignment condition. The assignment condition may include, for example, assigning the coping target 30 to the closest threat coping device 300. The processor 240 obtains a state of the threat coping device 300, such as its location, from the threat coping device 300. The processor 240 compares distances from the location of the coping target 30 to the location of each threat coping device 300 to decide the threat coping device 300 to which the coping target 30 is assigned.

The assignment condition may include a longest time for coping with. The processor 240 obtains a state of the threat coping device 300, such as its location and its range, from the threat coping device 300. The processor 240 predicts a moving route of the coping target 30 and calculates a coping time during which the coping target 30 passes through an area in the range of the threat coping device 300 when moving along the predicted route. The processor 240 assigns the coping target 30 to the threat coping device 300 of which the calculated coping time is the longest.

The assignment condition may include a current assignment of the coping target 30. In this case, the storage device 230 stores data of the threat coping device 300 to which the coping target 30 is currently assigned. The processor 240 reads out data of the threat coping device 300 to which the coping target 30 is currently assigned from the storage device 230 and assigns the coping target 30 to the threat coping device 300 corresponding to the read data. Data of the currently assigned threat coping device 300 may be included in the coping list 700.

The assignment condition may be an arbitrary combination of the above-described assignment conditions. For example, the processor 240 may calculate an assignment priority based on the above-described assignment conditions and decides the threat coping device 300 to assign the coping target 30 based on the calculated assignment priority. For example: a first assignment priority is set in accordance with a distance from the location of the protected object to the location of the threat coping device 300; a second assignment priority is set in accordance with the time to cope with; and an assignment priority as a whole is calculated based on this first assignment priority and this second assignment priority.

Processes from the step S220 to the step S280 are similar to the embodiment 1 and therefore descriptions thereof will be omitted.

As described above, the threat coping system 10 can be provided with a plurality of threat coping devices 300.

Embodiment 3

The threat coping system 10 may, when provided with a plurality of threat coping devices 300, cope with one of detected coping target 30 by use of a plurality of threat coping devices 300. This case is similar to the embodiment 1 and therefore description thereof will be omitted, except the coping list 700 shown in FIG. 9 and processes of the coping instruction module 520 shown in FIG. 10.

Figure 19:
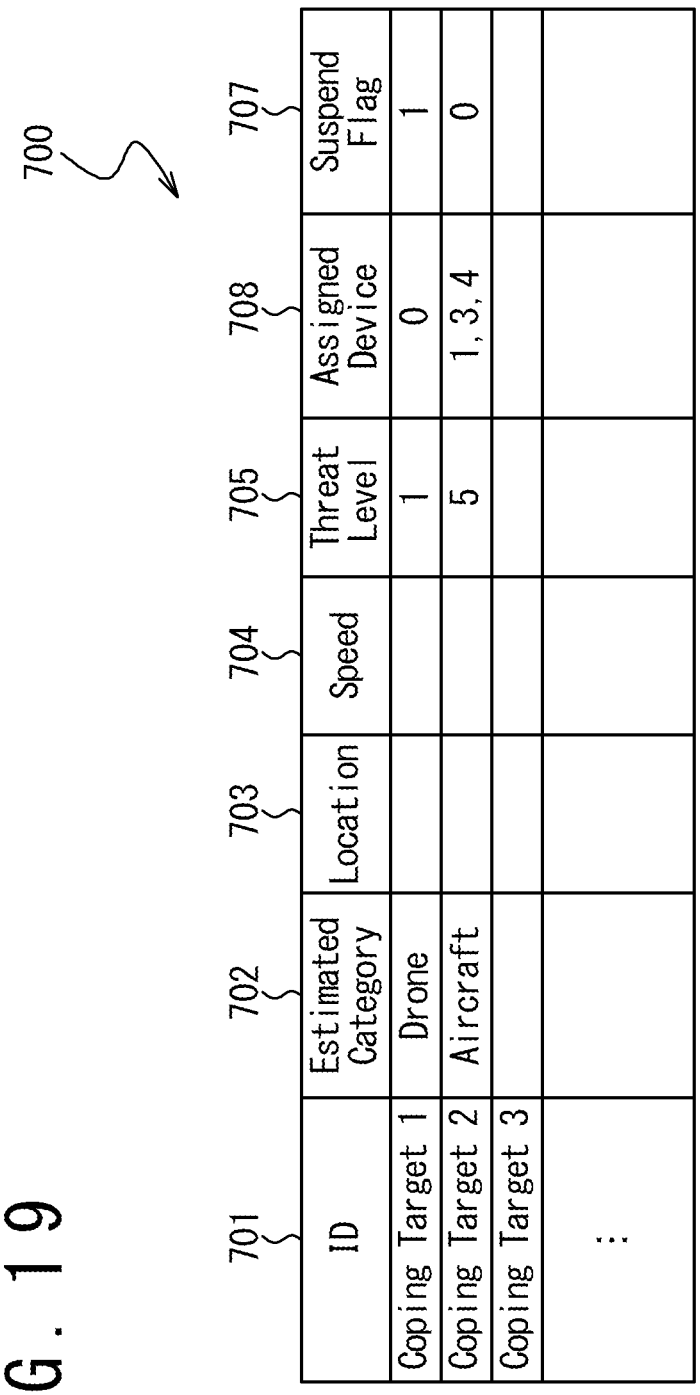
FIG. 19 is a diagram to explain the coping list according to an embodiment.

As shown in FIG. 19, the coping list 700 stores, for example, the ID 701, the estimated category 702, the location 703, the speed 704, the threat level 705, the suspend flag 707 and an assigned device 708 of each moving body. The assigned device 708 is data that indicates the threat coping device 300 assigned to the corresponding coping target 30. A plurality of values can be registered to the assigned device 708 to assign a single coping target 30 to a plurality of threat coping devices 300. The ID 701, the estimated category 702, the location 703, the speed 704, the threat level 705 and the suspend flag 707 that remain are similar to the embodiment 1 and therefore descriptions thereof will be omitted.

The coping instruction module 520 makes the processor 240 execute processes similar to the processes shown in FIG. 18, except the assignment of the coping target 30 to a plurality of threat coping devices 300. The step S200 and the step S210 are similar to the embodiment 2 and therefore descriptions thereof will be omitted.

In the step S215, the processor 240 decides a plurality of threat coping devices 300 assigned to a selected coping target 30, based on a desired assignment condition. For example, a maximum value of a number of the threat coping devices 300 to decide is preliminarily decided. The assignment condition may include the assignment conditions in the embodiment 2. For example, the processor 240 may select a desired number of threat coping devices 300 in order from a shorter distance from the location of the coping target 30 and assign the coping target 30 to the selected threat coping devices 300. In addition, a desired number of threat coping devices 300 may be selected in order from a longer time to cope with, and the coping target 30 may be assigned to the selected threat coping devices 300. The processor 240 may arbitrarily combine the assignment conditions to calculate an assignment priority and assign the coping target 30 to a plurality of threat coping devices 300 based on the calculated assignment priority.

In the steps S220 to S280, the processor 240 performs processes to each of the assigned threat coping devices 300. Details thereof are similar to the embodiment 2 and therefore descriptions thereof will be omitted.

As described above, the threat coping system 10 can assign a single coping target 30 to a plurality of threat coping devices 300.

Embodiment 4

The threat coping system 10 may, when provided with a plurality of threat coping devices 300, cope with a plurality of detected coping targets 30 by use of a plurality of threat coping devices 300. This case is similar to the embodiment 3 and therefore descriptions thereof will be omitted, except processes of the coping instruction module 520.

Figure 20:
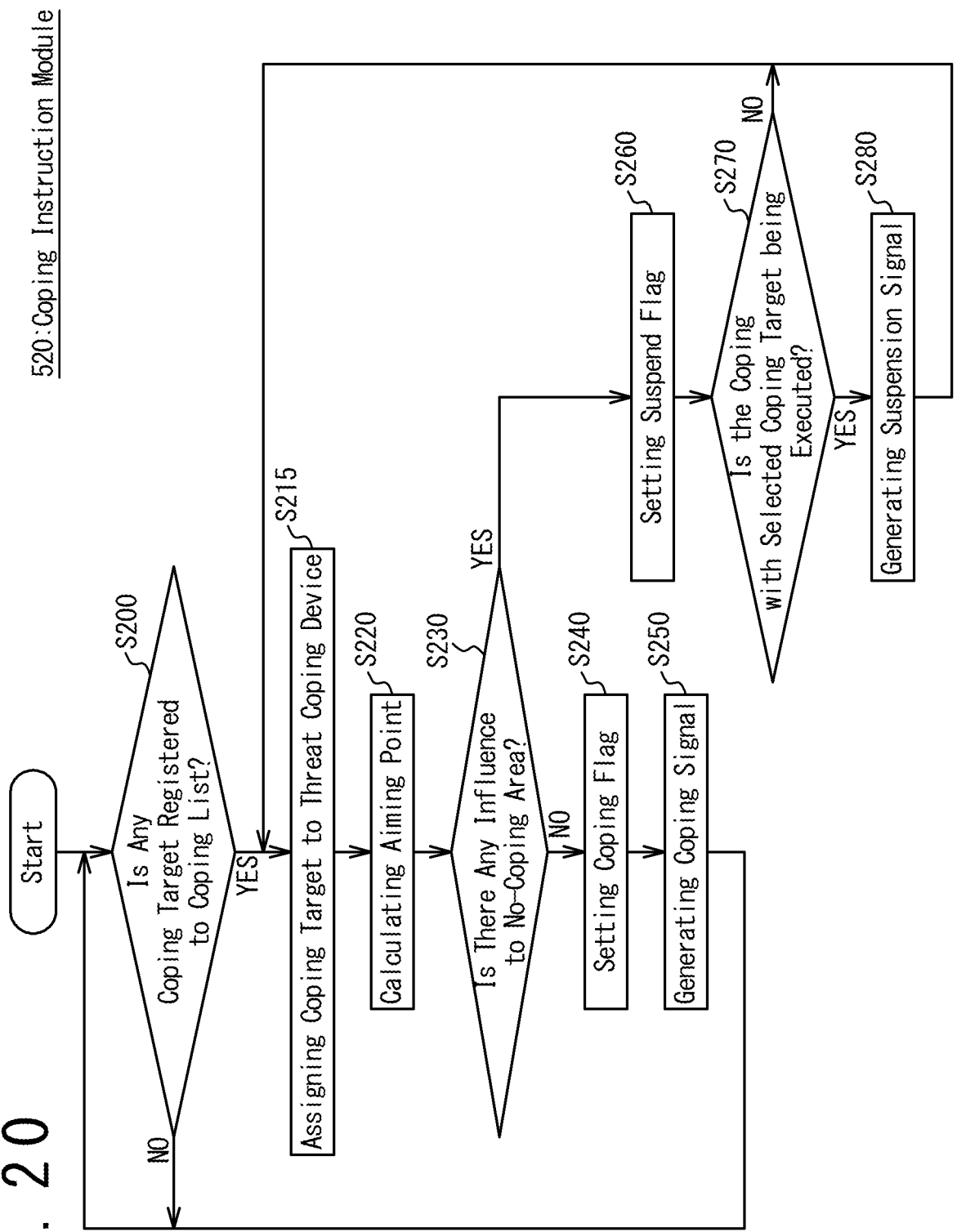
FIG. 20 is a flowchart that shows processes executed by the coping instruction module according to an embodiment.

The coping instruction module 520 makes the processor 240 execute processes shown in FIG. 20. In the step S200, the processor 240 verifies whether any coping target 30 is registered to the coping list 700 or not. When no coping target 30 is registered to the coping list 700 (step S200: NO), the processor 240 waits until a coping target 30 is registered. When a coping target 30 is registered to the coping list 700 (step S200: YES), the processor 240 executes the process of the step S215.

In the step S215, the processor 240 decides threat coping devices 300 to which the coping targets 30 registered to the coping list 700 are assigned, based on a desired assignment condition. The assignment condition may include a largest number of coping targets 30 which can be coped with. The processor 240 obtains states of the threat coping devices 300, such as locations and ranges, from the threat coping devices 300. The processor 240 assigns the coping targets 30 to the threat coping devices 300 so that a number of the coping targets 30 that can be coped with is the largest.

With respect to the assignment condition, the coping targets 30 may be assigned to the threat coping devices 300 based on performances of the threat coping devices 300 so that a number of coping targets 30 that can be defeated becomes the largest. The storage device 230 preliminarily stores the performances of the threat coping devices 300. The processor 240 reads out the performances of the threat coping devices 300 from the storage device 230 and assigns the coping targets 30 based on the read performances of the threat coping devices 300.

The assignment condition may include the assignment conditions of the embodiment 3. In addition, the processor 240 may arbitrarily combine assignment conditions to calculate assignment priorities and assign coping targets 30 to the plurality of threat coping devices 300 based on the calculated assignment priorities.

In the steps S220 to S280, the processor 240 performs processes to each of the assigned threat coping devices 300. Details thereof are similar to the embodiment 2 and therefore descriptions thereof will be omitted.

As described above, the threat coping system 10 can assign a plurality of threat coping devices 300 to a plurality of coping targets 30.

Embodiment 5

The threat coping system 10 may, when provided with a plurality of threat coping devices 300, assign the detected coping target 30 to the threat coping devices 300 based on the no-coping area 12. This case is similar to the embodiment 2 and therefore descriptions thereof will be omitted, except processes of the coping instruction module 520.

The coping instruction module 520 makes the processor 240 execute processes shown in FIG. 21. The processes in steps S200 to S210 are similar to the embodiment 2 and therefore descriptions thereof will be omitted.

In the step S220, similarly to the embodiment 2, the processor 240 calculates the aiming point to cope with the selected coping target 30. The aiming point is calculated based on the performance of the threat coping devices 300 and information of the coping target 30 such as a speed, a travelling direction or the like. The performance of the threat coping devices 300 includes, for example, a range distance, a time from starting a coping to affecting the aiming point (for example, a time from firing of an anti-aircraft missile to reaching the aiming point) or the like.

In the step S215, the processor 240 decides a plurality of threat coping devices 300 to which the selected coping target 30 is assigned, based on the no-coping area 12 and the desired assigning condition. The processor 240 extracts threat coping devices 300 that do not affect the no-coping area 12 even if they cope with the aiming point calculated in the step S220. Based on desired assignment condition, a threat coping device 300 to which the coping target 30 is assigned is selected among the extracted threat coping devices 300. The assignment condition is similar to the embodiment 2 and therefore descriptions thereof will be omitted.

The processes in the steps S230 to S280 are similar to the embodiment 3 and therefore descriptions thereof will be omitted.

As described above, the threat coping system 10 can assign the coping target 30 to the threat coping devices 300 based on the no-coping area 12.

Variation Examples

When the detection device 100 includes a transponder receiver or an IFF, the processor 240 may change detection data of a moving body detected by the transponder receiver or the IFF. For example, the processor 240 may delete an affiliation detected by the IFF and change the affiliation to unknown. The processor 240 outputs the detection data of the moving body detected by the detection device 100 to the input output device 220. A user verifies the detection data outputted to the input output device 220, selects the moving body by using the input output device 220 and performs operation of deleting the affiliation data registered to the selected moving body. The processor 240 deletes the affiliation data registered to the selected moving body based on the deletion operation inputted to the input output device 220. By doing so, the threat coping system 10 can cope with moving body that has spoofed a transponder signal or an IFF signal.

In the step S150 shown in FIG. 8, the processor 240 may determine whether any coping target 30 exists or not based on a feature of the moving body that the threat coping device 300 can cope with. The storage device 230 stores the feature of the moving body that the threat coping device 300 can cope with, such as a size, a shape, a category or the like. In the step S150, the processor 240 reads out the feature of the moving body that the threat coping device 300 can cope with from the storage device 230. The detection data of the moving body detected by the detection device 100 is compared to the feature of the moving body which is read out. The processor 240 determines, when the detected moving body is included in the moving bodies registered to the storage device 230, that this moving body corresponds to a coping target 30. As described above, it is determined whether any coping target 30 exists or not based on a feature of the moving body registered to the storage device 230. By comparing a feature of the moving body which the threat coping device 300 can cope with and a feature of the detected moving body, it is reduce to erroneously determine that a moving body that is not to be coped with corresponds to a coping target 30.

A no-coping area 12 may include a fixed area. For example, a no-coping area 12 may include a travelling route of a no-coping target 20 which is predetermined. A misfiring can be suppressed because an area where the threat coping device 300 copes with a coping target 30 is limited. In this case, processes in the steps S120 to S140 shown in FIG. 8 may be omitted when coping with a moving body in an area except a fixed area set as a no-coping area 12.

In addition, an arbitrary body may be set as a no-coping target 20. For example, a fixed body such as air facilities, private facilities or the like may be set as a no-coping target 20. A satellite orbiting on an orbit may be set as a no-coping target 20.

In the step S215 (for example, the step S215 shown in FIG. 18) of the coping instruction module 520, the processor 240 may output information that indicates a location and a category of the coping target 30 to the input output device 220. In addition, the processor 240 may output information that indicates a no-coping area 12 that is set and locations of the threat coping devices 300 to the input output device 220. For example, the input output device 220 may be provided with a display device that displays information to output. A user verifies the location of the coping target 30, the locations of the threat coping devices 300 and the no-coping area 12 that are outputted and uses the input output device 220 to select the threat coping device 300 to which the coping target 30 is to be assigned. When data that indicates the threat coping device 300 to which the coping target 30 is to be assigned is inputted to the input output device 220, the processor 240 assigns the coping target 30 to the threat coping device 300 based on the inputted data. As described above, the coping target 30 may be assigned in accordance with an input from a user. In addition, the processor 240 may calculate the threat coping device 300 to which a coping target 30 is to be assigned and output the calculation result as a recommended threat coping device 300 to the input output device 220.

In the step S250 (for example, the step S250 shown in FIG. 10) of the coping instruction module 520, the processor 240 may wait for an input from the user before generating a coping signal. In the step S250, the processor 240 outputs verification information to verify whether coping with the coping target 30 can be performed, to the input output device 220. The user inputs a response to the verification information to the input output device 220. The processor 240 generates a coping signal based on the response inputted to the input output device 220. When the response inputted to the input output device 220 indicates an approval to the coping, the processor 240 generates a coping signal to perform the process of the step S200. When the response inputted to the input output device 220 indicates an interdiction to the coping, the processor 240 performs the process of the step S200 without generating any coping signal. As a result, it can be decided whether the threat coping device 300 copes with the coping target 30 or not in accordance with the input from the user. It should be noted that a coping by a plurality of threat coping device 300 may be approved and a coping by a single threat coping device 300 may be approved by a single input to the input output device 220.

The threat coping system 10 may obtain data of a coping target 30 from an external device via a network. For example, the communication device 210 of the control device 200 is wiredly or wirelessly connected to the external device that has data of the coping target 30 and obtains the data of the coping target 30 from the external device. In the step S150 shown in FIG. 8, the processor 240 of the control device 200 may use the data of the coping target 30 obtained from the external device to determine whether the moving body corresponds to the coping target 30 or not.

The threat coping system 10 may obtain data of a no-coping target 20 from an external device via a network. For example, the communication device 210 of the control device 200 is wiredly or wirelessly connected to the external device that has data of the no-coping target 20 and obtains the data of the no-coping target 20 from the external device. In the step S120 shown in FIG. 8, the processor 240 of the control device 200 may use the data of the no-coping target 20 obtained from the external device to determine whether a moving body corresponds to the no-coping target 20 or not. In addition, in the step S140, the processor 240 may set the no-coping area 12 based on the data of the no-coping target 20 obtained from the external device.

The embodiments and variation examples described above are examples and may be modified within a range that does not inhibit functions. In addition, the described configurations of each of embodiments and variation examples may be modified withing a range that does not inhibit functions and/or may be arbitrarily combined. For example, the aiming point calculation means 524 and the coping instruction means 526 of the coping instruction module 520 may be included in the coping program 600. In this case, when performing the processes shown in FIG. 10, the coping instruction module 520 executed by the control device 200 generates, in the step S210, a selection signal that indicates a selected coping target 30. The coping program 600 executed by the threat coping device 300 calculates, in the step S220 among the processes shown in FIG. 10, the aiming point based on the selection signal. Then the coping program 600 executes the processes in the steps S230 and later. In addition, the assignment program 500 may be executed by a plurality of processors 240 and a part or all of the assignment program 500 may be executed by the threat coping device 300. In addition, the threat coping system 10 may obtain information of the no-coping target 20 and information of the coping target 30 from outside. In this case, the control device 200 can cope with the coping target 30 by executing the no-coping area setting means 514 and the coping instruction means 526. If the detection device 100 and the threat coping device 300 are connected to the threat coping system 10, the detection device 100 and the threat coping device 300 may not be included in the threat coping system 10.

A threat coping system described in each embodiment is understood for example as follows.

A threat coping system according to a first aspect is provided with a threat coping device (300) and a control device (200). The control device (200) is provided with a no-coping area setting means (514) and a coping instruction means (526). The no-coping area setting means (514) sets a no-coping area (12) based on information of a no-coping target which is not to cope with. The coping instruction means (526) generates an instruction signal that instructs the threat coping device to cope with the coping target, based on the no-coping area.

By setting a no-coping area by a no-coping area setting means, a misfiring to a no-coping target is suppressed.

A threat coping system according to a second aspect is the threat coping system according to the first aspect and the no-coping area setting means (514) sets the no-coping area around a moving body identified as the no-coping target.

The no-coping area may be an area of which a distance from the no-coping target is shorter than or equal to a desired distance.

A threat coping system according to a third aspect is the threat coping system according to the first aspect and is configured so that the no-coping area setting means (514) sets the no-coping area based on a length of the no-coping target.

The threat coping system according to a fourth aspect is the threat coping system according to the first aspect and the no-coping area setting means (514) is configured to set the no-coping area based on a speed of the no-coping target.

By setting a no-coping area based on a speed of a no-coping target, an area in accordance with the speed is set and misfiring to the no-coping target is suppressed. In addition, the faster the speed of the no-coping target, the wider the no-coping area may be set. The no-coping area may be set to an area of which a distance from the no-coping target is shorter than or equal to a distance proportional to the speed of the no-coping target. In addition, the longer the length of the no-coping target, the wider the no-coping area may be set. The no-coping area may be set to an area of which a distance from the no-coping target is shorter than or equal to a distance proportional to the length of the no-coping target.

A threat coping system according to a fifth aspect is the threat coping system according to the first aspect and is configured so that the no-coping area setting means (514) sets the no-coping area based on a travelling direction of the no-coping target (20).

In addition, the no-coping area may be expanded in the travelling direction of the no-coping target based on the speed of the coping target.

A threat coping system according to a sixth aspect is the threat coping system according to the first aspect and is configured so that the no-coping area setting means (514) sets the no-coping area based on a feature of a weapon with which a threat coping device (300) is provided.

By setting the no-coping area based on a feature of a weapon with which the threat coping device is provided, the threat coping system can cope with the coping target in accordance to the feature of the weapon and therefore can perform the coping with the coping target with suppressing misfiring to the no-coping target.

A threat coping system according to a seventh aspect is the threat coping system according to the sixth aspect and is configure so that the feature of the weapon with which the threat coping device is provided includes an aiming accuracy and an apex angle (18).

By setting the no-coping area based on the aiming accuracy and the apex angle of the weapon, the no-coping area is set in accordance to a size of an area where the threat coping devices affects when coping with the coping target. For this reason, influence to the no-coping target may be suppressed.

A threat coping system according to an eighth aspect is the threat coping system according to the sixth aspect and is configured so that the feature of the weapon with which the threat coping device is provided includes a range of effect obtained when the weapon hits the moving body.

A threat coping system according to a ninth aspect is the threat coping system according to the first aspect and is configured so that the coping instruction means (526) generates a coping signal that instructs the threat coping device to cope when the threat coping device (300) does not affect the no-coping area by coping with the coping target (30).

A threat coping system according to a tenth aspect is the threat coping system according to the first aspect and is configured so that the coping instruction means (526) generates a suspension signal that instructs the threat coping device (300) to suspend coping when the threat coping device (300) affects the no-coping area (12) by coping with the coping target (30).

As the threat coping device suspends coping with the coping target, an influence to the no-coping area may be reduced.

A threat coping system according to an eleventh aspect is the threat coping system according to the ninth aspect and is configured so that the coping instruction means (526) determines that the threat coping device (300) affects the no-coping area (12) by coping with the coping target (30) when a range of effect (14) of coping by the threat coping device (300) overlaps the no-coping area (12).

A threat coping system according to a twelfth aspect is the threat coping system according to the eleventh aspect and is configured so that the range of effect (14) includes a coping route (16) where a coping object for a weapon with which the threat coping device (300) is provided to destroy the coping target (30), passes.

A threat coping system according to the thirteenth aspect is the threat coping system according to the eleventh aspect and is configured so that the range of effect (14) includes a conical area having an apex angle (18) in accordance with a weapon with which the threat coping device is provided when the coping route (16) is linearly extended.

The present application claims priority based on Japanese Patent Application No. 2019-130595 filed on Jul. 12, 2019 and herein incorporates all disclosure thereof.

The invention claimed is:

1. A threat coping system comprising:
a threat coping device configured to cope with a coping target which is a threat including any of a drone and an Unmanned Aerial Vehicle (UAV) that attacks without notice; and
a control device configured to control the threat coping device,
wherein the control device is configured to perform:
setting a no-coping area based on information of a no-coping target which is a moving object including any of a commercial aircraft and a satellite orbiting on an orbit and is not to be coped with by the threat coping device, the no-coping area being an area in which an influence from a range of effect obtained by the threat coping device when coping with the coping target is lower than or equal to a predetermined condition; and
prohibiting coping with the coping target when the influence to the no-coping area exists, and generating an instruction signal, that instructs the threat coping device to cope or not to cope with the coping target, based on whether the influence to the no-coping area by coping with the coping target exists, and
wherein coping means that the coping target is defeated by the threat coping device.

2. The threat coping system according to claim 1, wherein the setting includes setting the no-coping area around the no-coping target.

3. The threat coping system according to claim 1, wherein the setting includes setting the no-coping area based on a length of the no-coping target.

4. The threat coping system according to claim 1, wherein the setting includes setting the no-coping area based on a speed of the no-coping target.

5. The threat coping system according to claim 1, wherein the setting includes setting the no-coping area based on a travelling direction of the no-coping target.

6. The threat coping system according to claim 1, wherein the setting includes setting the no-coping area based on a feature of a weapon which the threat coping device comprises.

7. The threat coping system according to claim 6, wherein the feature of the weapon which the threat coping device comprises includes an aiming accuracy and an apex angle.

8. The threat coping system according to claim 6, wherein the feature of the weapon which the threat coping device comprises includes a range of effect obtained when the weapon hits the coping target.

9. The threat coping system according to claim 1, wherein the generating includes generating a coping signal, that instructs the threat coping device to cope, when the threat coping device does not affect the no-coping area by coping with the coping target.

10. The threat coping system according to claim 1, wherein the generating includes generating a suspension signal, that instructs the threat coping device to suspend coping, when the threat coping device affects the no-coping area by coping with the coping target.

11. The threat coping system according to claim 9, wherein the generating includes determining that the threat coping device affects the no-coping area by coping with the coping target when a range of effect of coping by the threat coping device overlaps the no-coping area.

12. The threat coping system according to claim 11, wherein the range of effect includes a coping route where a coping object for a weapon that the threat coping device comprises to destroy the coping target, passes.

13. The threat coping system according to claim 12, wherein the range of effect includes a conical area having an apex angle in accordance with a weapon which the threat coping device comprises when the coping route is linearly extended.

* * * * *